United States Patent
Von Arx et al.

(10) Patent No.: US 6,519,835 B1
(45) Date of Patent: Feb. 18, 2003

(54) METHOD OF FORMABLE THERMOPLASTIC LAMINATE HEATED ELEMENT ASSEMBLY

(75) Inventors: Theodore Von Arx, La Crescent, MN (US); Keith Laken, Winona, MN (US); John W. Schlesselman, Fountain City, WI (US)

(73) Assignee: Watlow Polymer Technologies, Winona, MN (US)

( * ) Notice: Subject to any disclaimer, the term of this patent is extended or adjusted under 35 U.S.C. 154(b) by 0 days.

(21) Appl. No.: 09/642,215

(22) Filed: Aug. 18, 2000

(51) Int. Cl.⁷ .................................................. H05B 3/00
(52) U.S. Cl. .................... 29/611; 29/610.1; 29/612; 219/544; 219/528; 219/529
(58) Field of Search ................. 29/610, 610.1, 29/611, 612; 219/549, 529, 528, 544, 545, 548; 338/208, 210, 211, 275, 262, 258

(56) References Cited

U.S. PATENT DOCUMENTS

| | | | |
|---|---|---|---|
| 579,611 A | 3/1897 | Smith | |
| 1,043,922 A | 11/1912 | Gold | 219/523 |
| 1,046,465 A | 12/1912 | Hoyt | |
| 1,058,270 A | 4/1913 | Stephens | 219/217 |
| 1,281,157 A | 10/1918 | Hadaway, Jr. | |
| 1,477,602 A | 12/1923 | Simon | |
| 1,674,488 A | 6/1928 | Tang | |
| 1,987,119 A | 1/1935 | Long | 219/39 |
| 1,992,593 A | 2/1935 | Whitney | 219/46 |
| 2,104,848 A | 1/1938 | Clark | 200/137 |
| 2,146,402 A | 2/1939 | Morgan | 219/523 |
| 2,202,095 A | 5/1940 | Delhaye et al. | 219/217 |
| 2,255,527 A | 9/1941 | Locke | 110/29 |
| 2,274,445 A | 2/1942 | Greer | 219/38 |
| 2,426,976 A | 9/1947 | Taulman | 219/19 |

(List continued on next page.)

FOREIGN PATENT DOCUMENTS

| | | |
|---|---|---|
| DE | 35 12 659 A | 9/1986 |
| DE | 3512659 | 10/1986 |
| DE | 38 36 387 C1 | 5/1990 |
| FR | 2 737 380 | 1/1997 |
| GB | 14562 | 9/1913 |

(List continued on next page.)

OTHER PUBLICATIONS

"Polymers", *Guide to Selecting Engineered Materials*, a special issue of *Advanced Materials & Processes*, Metals Park, OH, ASM International, 1989, pp. 92–93.
"Makroblend Polycarbonate Blend, Tedur Polyphenylene Sulfide", *Machine Design: Basics of Design Engineering*, Cleveland, OH, Penton Publishing, Inc., Jun. 1991, pp. 820–821, 863, 866–867.

(List continued on next page.)

*Primary Examiner*—Carl J. Arbes
*Assistant Examiner*—Minh Trinh
(74) *Attorney, Agent, or Firm*—Duane Morris LLP

(57) ABSTRACT

A semi-rigid heated element assembly and method of manufacturing semi-rigid heated element assemblies is provided. A heated element assembly includes a first thermoplastic sheet, a second thermoplastic sheet, and a resistance heating element laminated between the first and second thermoplastic sheets. The resistance heating element includes a supporting substrate having a first surface thereon and an electrical resistance heating material forming a predetermined circuit path having a pair of terminal end portions. The circuit path continues onto at least one flap portion that is capable of rotating about a first axis of rotation. The reformable continuous element structure may be formed into a final element assembly configuration whereby at least the flap portion is rotated along its axis of rotation to provide resistance heating in at least two planes. Semi-rigid heating elements may be formed into heated containers, heated bags, and other objects with complex heat planes.

15 Claims, 11 Drawing Sheets

U.S. PATENT DOCUMENTS

| | | | |
|---|---|---|---|
| 2,456,343 A | 12/1948 | Tuttle | 201/67 |
| 2,464,052 A | 3/1949 | Numrich | 219/38 |
| 2,593,087 A | 4/1952 | Baggett | 219/217 |
| 2,593,459 A | 4/1952 | Johnson | 219/39 |
| 2,710,909 A | 6/1955 | Logan et al. | 219/46 |
| 2,719,907 A | 10/1955 | Combs | 219/46 |
| 2,804,533 A | 8/1957 | Nathanson | 219/522 |
| 2,889,439 A | 6/1959 | Musgrave | 219/19 |
| 2,938,992 A | 5/1960 | Crump | 219/46 |
| 3,061,501 A | 10/1962 | Dittman et al. | 156/250 |
| 3,173,419 A | 3/1965 | Dubilier et al. | 128/399 |
| 3,191,005 A | 6/1965 | Cox | 219/528 |
| 3,201,738 A | 8/1965 | Mitoff | 338/238 |
| 3,211,203 A | 10/1965 | Creed et al. | 146/81 |
| 3,238,489 A | 3/1966 | Hay | 388/250 |
| 3,268,846 A | 8/1966 | Morey | 338/212 |
| 3,296,415 A | 1/1967 | Eisler | 219/385 |
| 3,352,999 A | 11/1967 | Macoicz et al. | 219/321 |
| 3,374,338 A | 3/1968 | Morey | 219/529 |
| 3,385,959 A | 5/1968 | Ames et al. | |
| 3,496,517 A | 2/1970 | Walter | 339/18 |
| 3,535,494 A | 10/1970 | Armbruster | 219/528 |
| 3,564,589 A | 2/1971 | Arak | 219/331 |
| 3,573,430 A | 4/1971 | Eisler | 219/385 |
| 3,597,591 A | 8/1971 | Van Derlip | 219/528 |
| 3,614,386 A | 10/1971 | Hepplewhite | 219/312 |
| 3,621,566 A | 11/1971 | Welsh | 29/610 |
| 3,623,471 A | 11/1971 | Bogue et al. | 126/263.01 |
| 3,648,659 A | 3/1972 | Jones | 119/1 |
| 3,657,516 A | 4/1972 | Fujihara | 219/345 |
| 3,657,517 A | 4/1972 | Hoyt | 219/535 |
| D224,406 S | 7/1972 | Heck | D26/1 |
| 3,678,248 A | 7/1972 | Ticault et al. | 219/525 |
| 3,683,361 A | 8/1972 | Salzwedel | 338/322 |
| 3,686,472 A | 8/1972 | Harris | 219/213 |
| 3,707,618 A | 12/1972 | Zeitlin et al. | 219/336 |
| 3,725,645 A | 4/1973 | Shevlin | 219/521 |
| 3,774,299 A | 11/1973 | Sato et al. | 29/611 |
| 3,781,526 A | 12/1973 | Damron | 219/538 |
| 3,806,701 A | 4/1974 | Scott | 219/438 |
| 3,808,403 A | 4/1974 | Kanaya et al. | 219/528 |
| 3,831,129 A | 8/1974 | Frey | 339/19 |
| 3,859,504 A | 1/1975 | Motokawa et al. | 219/528 |
| 3,860,787 A | 1/1975 | Strobach | 219/336 |
| 3,875,373 A | 4/1975 | Lowery et al. | 219/526 |
| 3,878,362 A | 4/1975 | Stinger | 219/528 |
| 3,888,711 A | 6/1975 | Breitner | 156/93 |
| 3,900,654 A | 8/1975 | Stinger | 428/214 |
| 3,908,749 A | 9/1975 | Williams | 165/2 |
| 3,927,300 A | 12/1975 | Wada et al. | 219/381 |
| 3,933,550 A | 1/1976 | Erwin | 156/85 |
| 3,943,328 A | 3/1976 | Cunningham | 219/335 |
| 3,952,182 A | 4/1976 | Falnders | 219/309 |
| 3,968,348 A | 7/1976 | Stanfield | 219/535 |
| 3,974,358 A | 8/1976 | Goltsos | 219/387 |
| 3,976,855 A | 8/1976 | Altmann et al. | 219/532 |
| 3,985,928 A | 10/1976 | Watanabe et al. | 428/273 |
| 3,987,275 A | 10/1976 | Hurko | 219/461 |
| 4,021,642 A | 5/1977 | Fields, Jr. | 219/391 |
| 4,038,519 A | 7/1977 | Foucras | 219/301 |
| 4,046,989 A | 9/1977 | Parise et al. | 219/437 |
| 4,055,526 A * | 10/1977 | Kiyokawa | 264/22 |
| 4,058,702 A | 11/1977 | Jerles | 219/321 |
| 4,060,710 A | 11/1977 | Reuter et al. | 219/548 |
| 4,068,115 A | 1/1978 | Mack et al. | 219/386 |
| 4,083,355 A | 4/1978 | Schwank | 126/39 J |
| 4,094,297 A | 6/1978 | Ballentine | 126/39 J |
| 4,102,256 A | 7/1978 | John et al. | 99/372 |
| 4,112,410 A | 9/1978 | Wrob et al. | 338/243 |
| 4,117,311 A | 9/1978 | Strom | 219/544 |
| 4,119,834 A | 10/1978 | Losch | 392/418 |
| 4,152,578 A | 5/1979 | Jacobs | 219/336 |
| 4,158,078 A | 6/1979 | Egger et al. | 219/102 |
| 4,176,274 A | 11/1979 | Lippera | 219/522 |
| 4,186,294 A | 1/1980 | Bender | 219/527 |
| 4,201,184 A | 5/1980 | Scheidler et al. | 126/39 J |
| 4,233,495 A | 11/1980 | Scoville et al. | 219/386 |
| 4,245,149 A | 1/1981 | Fairlie | 219/528 |
| 4,250,397 A | 2/1981 | Gray et al. | 392/435 |
| 4,272,673 A | 6/1981 | Semanaz et al. | 219/544 |
| 4,294,643 A | 10/1981 | Tadewald | 156/293 |
| 4,296,311 A | 10/1981 | Hagglund et al. | 219/464 |
| 4,304,987 A | 12/1981 | van Konynenburg | 219/553 |
| 4,313,053 A | 1/1982 | Sturm | 219/544 |
| 4,313,777 A | 2/1982 | Buckley et al. | 156/272 |
| 4,321,296 A | 3/1982 | Rougier | 428/212 |
| 4,326,121 A | 4/1982 | Welsby et al. | 219/523 |
| 4,334,146 A | 6/1982 | Sturm | 219/492 |
| 4,337,182 A | 6/1982 | Needham | 524/609 |
| 4,346,277 A | 8/1982 | Wojtecki et al. | 219/528 |
| 4,346,287 A | 8/1982 | Desloge | 219/541 |
| 4,349,219 A | 9/1982 | Sturm | 285/21 |
| 4,354,096 A | 10/1982 | Dumas | 219/523 |
| 4,358,552 A | 11/1982 | Shinohara et al. | 523/443 |
| 4,364,308 A | 12/1982 | John et al. | 99/351 |
| 4,375,591 A | 3/1983 | Sturm | 219/544 |
| 4,387,293 A | 6/1983 | Grice et al. | 219/529 |
| 4,388,607 A | 6/1983 | Toy et al. | 338/22 SD |
| 4,390,551 A | 6/1983 | Swartley et al. | 426/107 |
| 4,419,567 A | 12/1983 | Murphy et al. | 219/336 |
| 4,429,215 A | 1/1984 | Sakai et al. | 219/528 |
| 4,436,988 A | 3/1984 | Blumenkranz | 219/544 |
| 4,482,239 A | 11/1984 | Hosono et al. | 355/3 |
| 4,493,985 A | 1/1985 | Keller | 219/535 |
| 4,501,951 A | 2/1985 | Benin et al. | 219/243 |
| 4,530,521 A | 7/1985 | Nyffeler et al. | 285/21 |
| 4,534,886 A | 8/1985 | Kraus et al. | 252/502 |
| 4,540,479 A | 9/1985 | Sakurai et al. | 204/427 |
| 4,606,787 A | 8/1986 | Pelligrino | 156/632 |
| 4,633,063 A | 12/1986 | Willis | 219/243 |
| 4,640,226 A | 2/1987 | Liff | 119/1 |
| 4,641,012 A | 2/1987 | Roberts | 219/331 |
| 4,658,121 A | 4/1987 | Horsma et al. | 219/553 |
| 4,687,905 A | 8/1987 | Cunningham et al. | 219/336 |
| 4,703,150 A | 10/1987 | Kunnecke et al. | 219/535 |
| 4,707,590 A | 11/1987 | Lefebvre | 219/523 |
| 4,725,717 A | 2/1988 | Harrison | 219/528 |
| 4,730,148 A | 3/1988 | Nakata | 315/397 |
| 4,751,528 A | 6/1988 | Spehrley, Jr. et al. | 346/140 |
| 4,756,781 A | 7/1988 | Etheridge | 156/85 |
| 4,762,980 A | 8/1988 | Insley | 219/307 |
| 4,784,054 A | 11/1988 | Karos et al. | 99/483 |
| 4,797,537 A | 1/1989 | Berthelius et al. | 219/528 |
| 4,845,343 A | 7/1989 | Aune et al. | 219/545 |
| 4,860,434 A | 8/1989 | Louison et al. | 29/611 |
| 4,865,014 A | 9/1989 | Nelson | 126/361 |
| 4,865,674 A | 9/1989 | Durkin | 156/158 |
| 4,866,252 A | 9/1989 | Van Loo et al. | 219/535 |
| 4,911,978 A | 3/1990 | Tsubone et al. | 428/317.9 |
| 4,913,666 A | 4/1990 | Murphy | 439/709 |
| 4,927,999 A | 5/1990 | Hanselka | 219/535 |
| 4,948,948 A | 8/1990 | Lesage | 219/329 |
| 4,956,138 A | 9/1990 | Barfield | 264/129 |
| 4,970,528 A | 11/1990 | Beaufort et al. | 346/25 |
| 4,972,197 A | 11/1990 | McCauley et al. | 343/704 |
| 4,982,064 A | 1/1991 | Hartman et al. | 219/727 |
| 4,983,814 A | 1/1991 | Ohgushi et al. | 219/545 |
| 4,986,870 A | 1/1991 | Frohlich | 156/382 |
| 4,993,401 A | 2/1991 | Diekmann et al. | 126/39 |
| 5,003,693 A | 4/1991 | Atkinson et al. | 29/849 |
| 5,013,890 A | 5/1991 | Gamble | 392/497 |

| | | | |
|---|---|---|---|
| 5,021,805 A | 6/1991 | Imaizumi et al. | 346/76 R |
| 5,023,433 A | 6/1991 | Gordon | 219/548 |
| 5,038,458 A | 8/1991 | Wagoner et al. | 29/593 |
| 5,041,846 A | 8/1991 | Vincent et al. | 346/25 |
| 5,051,275 A | 9/1991 | Wong | 427/58 |
| 5,066,852 A | 11/1991 | Willbanks | 219/544 |
| 5,068,518 A | 11/1991 | Yasuda | 219/549 |
| 5,073,320 A | 12/1991 | Sterzel | 264/101 |
| 5,111,025 A | 5/1992 | Barma et al. | 29/217 |
| 5,113,480 A | 5/1992 | Murphy et al. | 392/501 |
| 5,129,033 A | 7/1992 | Ferrara et al. | 392/447 |
| 5,136,143 A | 8/1992 | Kutner et al. | 219/544 |
| 5,155,800 A | 10/1992 | Rezabek et al. | 382/503 |
| 5,162,634 A | 11/1992 | Kusaka | 219/216 |
| 5,184,969 A | 2/1993 | Sharpless et al. | 445/24 |
| 5,208,080 A | 5/1993 | Gajewski et al. | 428/1 |
| 5,221,419 A | 6/1993 | Beckett | 156/630 |
| 5,221,810 A | 6/1993 | Spahn | 102/475 |
| 5,237,155 A | 8/1993 | Hill | 219/544 |
| 5,252,157 A | 10/1993 | Inhofe, Jr. | 156/158 |
| 5,255,595 A | 10/1993 | Higgins | 99/378 |
| 5,255,942 A | 10/1993 | Kenworthy | 285/21 |
| 5,271,085 A | 12/1993 | Carballo | 392/444 |
| 5,287,123 A | 2/1994 | Medin et al. | 346/140 R |
| 5,293,446 A | 3/1994 | Owens et al. | 392/449 |
| 5,300,760 A | 4/1994 | Batliwalla et al. | 219/549 |
| 5,302,807 A | 4/1994 | Zhao | 219/211 |
| 5,304,778 A | 4/1994 | Dasgupta et al. | 219/270 |
| 5,313,034 A | 5/1994 | Grimm | 156/274.2 |
| 5,335,820 A * | 8/1994 | Christianson | 222/105 |
| 5,389,184 A | 2/1995 | Jacaruso et al. | 156/378 |
| 5,397,873 A | 3/1995 | Stoops et al. | 219/450 |
| 5,406,316 A | 4/1995 | Schwiebert et al. | 347/18 |
| 5,406,321 A | 4/1995 | Schwiebert et al. | 347/102 |
| 5,408,070 A | 4/1995 | Hyllberg | 392/503 |
| 5,453,599 A | 9/1995 | Hall, Jr. | 219/544 |
| 5,461,408 A | 10/1995 | Giles et al. | 347/102 |
| 5,476,562 A | 12/1995 | Inhofe, Jr. | 156/156 |
| 5,477,033 A | 12/1995 | Bergholtz | 219/549 |
| 5,497,883 A * | 3/1996 | Monetti | 206/545 |
| 5,500,667 A | 3/1996 | Schwiebert et al. | 347/102 |
| 5,520,102 A | 5/1996 | Monetti | 99/483 |
| 5,521,357 A | 5/1996 | Lock et al. | 219/543 |
| 5,571,435 A | 11/1996 | Needham | 219/544 |
| 5,572,290 A | 11/1996 | Ueno et al. | 399/329 |
| 5,581,289 A | 12/1996 | Firl et al. | 347/104 |
| 5,582,754 A | 12/1996 | Smith et al. | 219/438 |
| 5,586,214 A | 12/1996 | Eckman | 392/503 |
| 5,618,065 A | 4/1997 | Akiyama | 285/21.2 |
| 5,619,240 A | 4/1997 | Pong et al. | 347/103 |
| 5,625,398 A | 4/1997 | Milkovits et al. | 347/104 |
| 5,633,668 A | 5/1997 | Schwiebert et al. | 347/102 |
| 5,691,756 A | 11/1997 | Rise et al. | 347/102 |
| 5,697,143 A | 12/1997 | Barfield | 29/611 |
| 5,703,998 A | 12/1997 | Eckman | 392/340 |
| 5,708,251 A | 1/1998 | Naveh | 219/121.66 |
| 5,714,738 A | 2/1998 | Hauschulz et al. | 219/535 |
| 5,779,870 A | 7/1998 | Seip | 205/77 |
| 5,780,817 A | 7/1998 | Eckman et al. | 219/458 |
| 5,780,820 A | 7/1998 | Komyoji et al. | 219/543 |
| 5,781,412 A | 7/1998 | De Sorgo | 361/704 |
| 5,806,177 A | 9/1998 | Hosomi et al. | 29/846 |
| 5,811,769 A | 9/1998 | Schiffmann et al. | 219/762 |
| 5,822,675 A | 10/1998 | Paquet et al. | 428/561 |
| 5,824,996 A | 10/1998 | Kochman et al. | 219/529 |
| 5,829,171 A | 11/1998 | Weber et al. | 36/93 |
| 5,835,679 A | 11/1998 | Eckman et al. | 392/503 |
| 5,856,650 A | 1/1999 | Rise et al. | 219/216 |
| 5,880,435 A * | 3/1999 | Bostic | 219/387 |
| 5,883,364 A | 3/1999 | Frei et al. | 219/535 |
| 5,892,202 A * | 4/1999 | Baldwin | 219/387 |
| 5,902,518 A | 5/1999 | Khazai et al. | 252/511 |
| 5,930,459 A | 7/1999 | Eckman | 392/503 |
| 5,932,129 A * | 8/1999 | Hyatt | 219/528 |
| 5,940,895 A | 8/1999 | Wilson et al. | 4/237 |
| 5,954,977 A | 9/1999 | Miller et al. | 219/201 |
| 6,037,574 A | 3/2000 | Lanham et al. | 219/544 |
| 6,056,157 A | 5/2000 | Gehl et al. | 222/94 |
| 6,089,406 A | 7/2000 | Feldner | 222/103 |
| 6,137,098 A | 10/2000 | Moseley et al. | 219/727 |
| 6,162,385 A | 12/2000 | Gross-Puppendahl et al. | 264/250 |
| 6,229,123 B1 * | 5/2001 | Kochmsn | 219/549 |
| 6,281,477 B1 * | 8/2001 | Forrester | 219/387 |
| 6,294,761 B1 * | 9/2001 | Diederich et al. | 219/386 |

FOREIGN PATENT DOCUMENTS

| | | |
|---|---|---|
| GB | 1070849 | 6/1967 |
| GB | 1325084 | 8/1973 |
| GB | 1498792 | 1/1978 |
| GB | 2244898 | 12/1999 |
| JP | 53-134245 | 11/1978 |
| JP | 3-129694 | 6/1991 |
| JP | 07 211438 A | 11/1995 |

OTHER PUBLICATIONS

European Search Report, Jul. 13, 1998.
"At HEI, Engineering is our Middle Name", Heaters Engineering, Inc., Mar. 2, 1995.
"Flexibility and cost Savings with Rope Elements", Heating Engineers, Inc. Aug. 1998.
Desloge Engineering Col, Letter to Lou Steinhauser dated Feb. 19, 1997.
Immersion Heaters Oil and Water, p. 11 (19__)v.
Special Purpose Flange Heaters, p. 58 (19__).
Lakewood Trade Literature entitled "Oil–Filled Radiator Heater" (19__).
Encon Drawing Part Nos. 02–06–480 & 02–06–481 (19__).
Encon Drawing No. 500765 (Jun. 10, 1987).
Vulcan Electric Company Trade Literature entitled "Bushing Immersion Heaters", 1983.
Trade Literature "Euro–Burner Solid Disc Conversion Burners" Energy Convertors, Inc., Dallas, PA 1991.
"Polymers" *Guide to Selecting Engineering Materials*, a special issue of Advanced Materials& Presses, Metals Park, OH, ASM International, 1990, pp. 32–33.
Machine Design, "Basics of Design Engineering" Jun. 1991, pp. 429–432, 551, 882–884.
Machine Design, "Basics of Design Engineering", Jun. 1994, pp 624–631.
Machine Design, May 18, 2000, 3 pages.
Carvill, Wm. T., "Prepreg Resins", Engineered Materials Handbook, vol. 1, Composites pp. 139–142.
Thermoplastic Polyimide (TPI) Features, RTP Company's 4200 series compounds (4 pages).
World Headquarters, RTP Co, RTP 1300 Series Polyphenylene Sulfide Compounds, 1 page.
World Headquarters, RTP Co, RTP 3400 Series Liquid Crystal Polymer Compounds, 1 page.
World Headquarters, RTP Co, RTP 4200 Series Thermoplastic Polyimide Compounds, 1 page.
A.M. Wittenberg, "Pin Shorting Contact," Western Electric Technical Digest No. 60, Oct. 1980, p. 25.
International Search Report, Aug. 8, 2000.
Kronenberg, K.J., "Magnetic Water Treatment De–Mystified", Green Country Environmental Associates, LLC, pp 1–8.

* cited by examiner

METHOD OF FORMABLE THERMOPLASTIC LAMINATE HEATED ELEMENT ASSEMBLY

CROSS REFERENCE TO RELATED APPLICATIONS

This Application is related to U.S. application Ser. No. 09/369,779 of Theodore Von Arx, filed Aug. 6, 1999, entitled "Electrofusing of thermoplastic heating elements and elements made thereby"; U.S. application Ser. No. 09/416,731 of John Schlesselman and Ronald Papenfuss, filed Oct. 13, 1999, entitled "Heating element containing sewn resistance material"; U.S. application Ser. No. 09/275,161 of Theodore Von Arx, James Rutherford and Charles Eckman, filed Mar. 24, 1999, entitled "Heating element suitable for preconditioning print media" which is a continuation in part of U.S. application Ser. No. 08/767,156 filed on Dec. 16, 1996, now U.S. Pat. No. 5,930,459, issued on Jul. 27, 1999, which in turn is a continuation in part of U.S. application Ser. No. 365,920, filed Dec. 29, 1994, now U.S. Pat. No. 5,586,214, issued on Dec. 17, 1996; U.S. application Ser. No. 09/544,873 of Theodore Von Arx, Keith Laken, John Schlesselman, and Ronald Papenfuss, filed Apr. 7, 2000, entitled "Molded assembly with heating element captured therein"; U.S. application Ser. No. 09/611,105 of Clifford D. Tweedy, Sarah J. Holthaus, Steven O. Gullerud, and Theodore Von Arx, filed Jul. 6, 2000, entitled "Polymeric heating elements containing laminated, reinforced structures and processes for manufacturing same";

and U.S. application Ser. No. 09/309,429 of James M. Rutherford, filed May 11, 1999, entitled "Fibrous supported polymer encapsulated electrical component" which are all hereby incorporated by reference.

FIELD OF THE INVENTION

This invention relates to electrical resistance heating elements, and more particularly to formable thermoplastic laminate heated element assemblies.

BACKGROUND OF THE INVENTION

Electric resistance heating elements composed of polymeric materials are quickly developing as a substitute for conventional metal sheathed heating elements, such as those containing a Ni—Cr coil disposed axially through a U-shaped tubular metal sheath. Good examples of polymeric heating elements include those disclosed in Eckman, et al., U.S. Pat. No. 5,586,214 issued Dec. 17, 1996 and Lock, et al., U.S. Pat. No. 5,521,357 issued May 28, 1996.

Eckman et al. '214 discloses a polymer encapsulated resistance heating element including a resistance heating member encapsulated within an integral layer of an electrically-insulating, thermally-conductive polymeric material. The disclosed heating elements are capable of generating at least about 1,000 watts for heating fluids such as water and gas.

Lock, et al. '357 discloses a heater apparatus including a resistive film formed on a substrate. The first and second electrodes are coupled to conductive leads which are electrically connected to the resistive film. The heater also includes an over molded body made of an insulating material, such as a plastic. Lock, et al. '357 further discloses that its resistive film may be applied to a substrate, such as a printed circuit board material.

Laminated heaters are also disclosed in Logan, et al., U.S. Pat. No. 2,710,909, issued Jun. 14, 1955 and Stinger, U.S. Pat. No. 3,878,362, issued Apr. 15, 1975. These laminated structures include partially cured rubber-like substances, backed with layers of glass cloth, such as disclosed in Logan, et al. '909, or the use of a discontinuous layer of electrically conductive elastomeric material containing conductive carbon adhered to a pair of spaced-apart conductor wires bonded to a durable plastic material, such as Stinger's polyethylene terephthalate film.

Other laminated heaters are disclosed in U.S. Pat. No. 2,889,439 to Musgrave, issued Jul. 29, 1955, and U.S. Pat. No. 3,268,846 to Morey, issued Aug. 23, 1966. Musgrave discloses a laminated heating panel including a resistance wire laminated between two sheets of asbestos paper impregnated with a phenolic resin or plastic. Morey discloses a flexible tape heating element and method of manufacturing the same. A resistance ribbon is sandwiched between a film of teflon, silicon rubber, or plastic material. There still remains a need, however, for a reformable but robust electrical resistance heated element which is easily adaptable to a variety of end uses and manufacturing processes. There also remains a need for a resistance heating element which is capable of capturing intricate circuit paths and which is reformable to provide efficient heating in complex heat planes.

SUMMARY OF THE INVENTION

The present invention comprises a heated element assembly and method of manufacturing heated element assemblies. A heated element assembly includes a first thermoplastic sheet, a second thermoplastic sheet, and a resistance heating element disposed between the first and second thermoplastic sheets. The resistance heating element comprises a supporting substrate having a first surface thereon and an electrical resistance heating material fastened to the supporting substrate, where the electrical resistance heating material forms a predetermined circuit path having a pair of terminal end portions. The resistance heating element also includes a first flap portion capable of rotation about a first axis of rotation where the circuit path continues onto at least a portion of the flap portion. The thermoplastic sheets and resistance heating element are laminated together to form a reformable continuous element structure. The continuous element structure is formed into a final element assembly configuration whereby at least the first flap portion is rotated about the first axis to provide resistance heating in at least two planes.

The present invention as described above provides several benefits. An intricate resistance circuit path of a resistance heating element may be secured to a planar supporting substrate and then laminated between thermoplastic sheets, whereby the planar resistance heating element may then be reformed with the laminated structure to provide heat on a plurality of heat planes. The heated element assembly may also be secured to a second heated element assembly to form, for example, a heated containment bag or a heated container. These heated structures provide intimate contact between the contents of the heated structures and the heat source, thereby providing inherent energy consumption advantages as well as the ability to intimately locate secondary devices such as thermistors, sensors, thermocouples, etc . . . , in proximity to the contents being heated or conditions being observed or recorded.

The heated element assembly also allows for an infinite number of circuit path shapes, allowing the circuit path to correspond to the general shape of a desired end product utilizing the heated element assembly. The heated element assembly may be folded to occupy a predefined space in an end product and to provide heat in more than one plane, thermoformed into a desired three dimensional heated plane, or stamped or die cut into a predetermined flat shape which may, then, be folded or thermoformed into a desired three dimensional heated shape. The heated element assembly thereby emulates well known sheet metal processing or known plastic forming processes and techniques.

The heated element assembly according to the present invention may also be over molded in a molding process whereby the resistance heating element is energized to soften the thermoplastic sheets and the heated element assembly is over molded with a thermoplastic to form a detailed molded structure. The energizing and overmolding steps may be timed such that the thermoplastic sheets and over molded thermoplastic form a substantially homogenous structure accurately capturing and positioning the resistance heating element within the structure. Alternatively, the heated element assembly may soften during mold flow without additional energizing.

In another embodiment of the present invention, a sheet of heated element assemblies comprises a first thermoplastic sheet, a second thermoplastic sheet affixed to the first thermoplastic sheet, and a sheet of resistance heating elements secured between and to the first and second thermoplastic sheets. The sheet of resistance heating elements includes a supporting substrate having a first surface thereon and a plurality of spaced circuit paths, each of the spaced circuit paths comprising an electrical resistance heating material fastened to the supporting substrate to form a predetermined circuit path having a pair of terminal end portions. Each of the circuit paths continue onto a first flap portion of a resistance heating element capable of rotation about a first axis of rotation. The thermoplastic sheets are laminated together such that the sheet of resistance heating elements is secured between and to the first and second thermoplastic sheets to form a reformable continuous element structure.

The sheet of heated element assemblies provides several benefits. The sheet may be inexpensively and efficiently produced using mass production techniques. The sheet may be collected into a roll, allowing the later separation and use of individual heated element assemblies or group of heated element assemblies as described above. The sheet, rather than being collected into a roll, may be further processed using various secondary fabrication techniques, such as stamping, die cutting, or overmolding.

The above and other features of the present invention will be better understood from the following detailed description of the preferred embodiments of the invention which is provided in connection with the accompanying drawings.

A BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

The present invention provides thermoplastic laminate heated element assemblies including resistance heating elements. As used herein, the following terms are defined:

"Laminate" means to unite laminae via bonding them together, usually with heat, pressure and/or adhesive. It normally is used to refer to flat sheets, but also can include rods and tubes. The term refers to a product made by such bonding;

"Serpentine Path" means a path which has one or more curves for increasing the amount of electrical resistance material in a given volume of polymeric matrix, for example, for controlling the thermal expansion of the element;

"Melting Temperature" means the point at which a fusible substance begins to melt;

"Melting Temperature Range" means the temperature range over which a fusible substance starts to melt and then becomes a liquid or semi-liquid;

"Degradation Temperature" means the temperature at which a thermoplastic begins to permanently lose its mechanical or physical properties because of thermal damage to the polymer's molecular chains;

"Evacuating" means reducing air or trapped air bubbles by, for example, vacuum or pressurized inert gas, such as argon, or by bubbling the gas through a liquid polymer.

"Fusion Bond" means the bond between two fusible members integrally joined, whereby the polymer molecules of one member mix with the molecules of the other. A Fusion Bond can occur, even in the absence of any direct or chemical bond between individual polymer chains contained within said members;

"Fused" means the physical flowing of a material, such as ceramic, glass, metal or polymer, hot or cold, caused by heat, pressure or both;

"Electrofused" means to cause a portion of a fusible material to flow and fuse by resistance heating;

"Stress Relief" means reducing internal stresses in a fusible material by raising the temperature of the material or material portion above its stress relief temperature, but preferably below its Heat Deflection Temperature; and "Flap" or "Flap Portion" means a portion of an element which can be folded without damaging the element structure.

RESISTANCE HEATING ELEMENT

Figure 1:
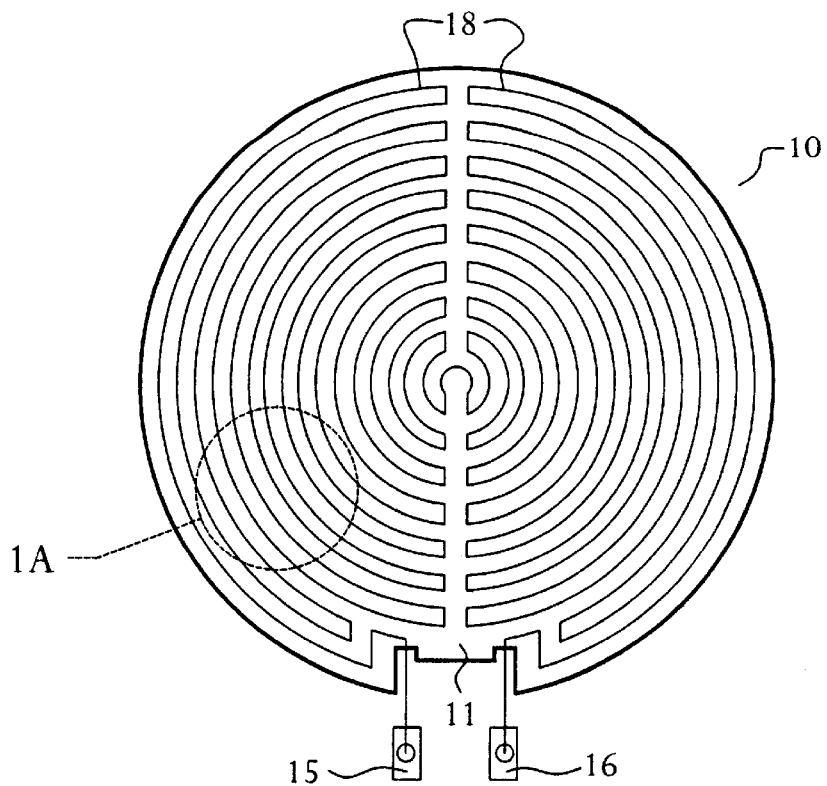
FIG. 1 is a front plan view of a resistance heating element, including a resistance wire disposed in a circuit path on a supporting substrate and joined to a pair of electrical connectors.
Figure 1A:
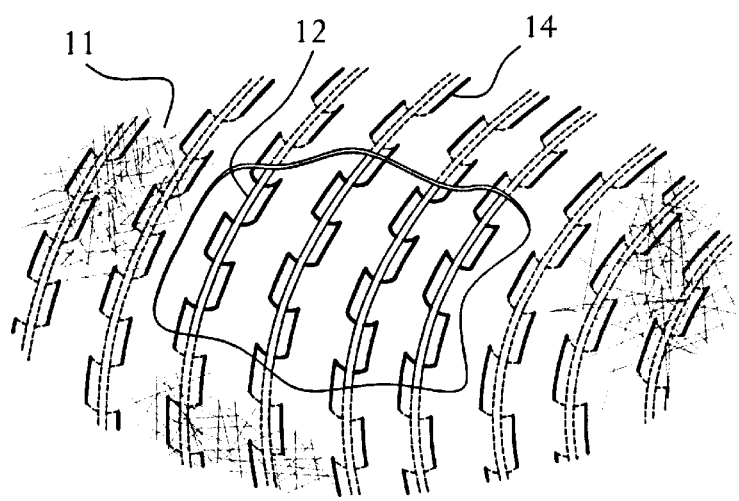
FIG. 1A is a front plan, enlarged view, of a portion of the resistance heating element of FIG. 1, showing the preferred cross-stitch attachment to the supporting substrate.
Figure 2:
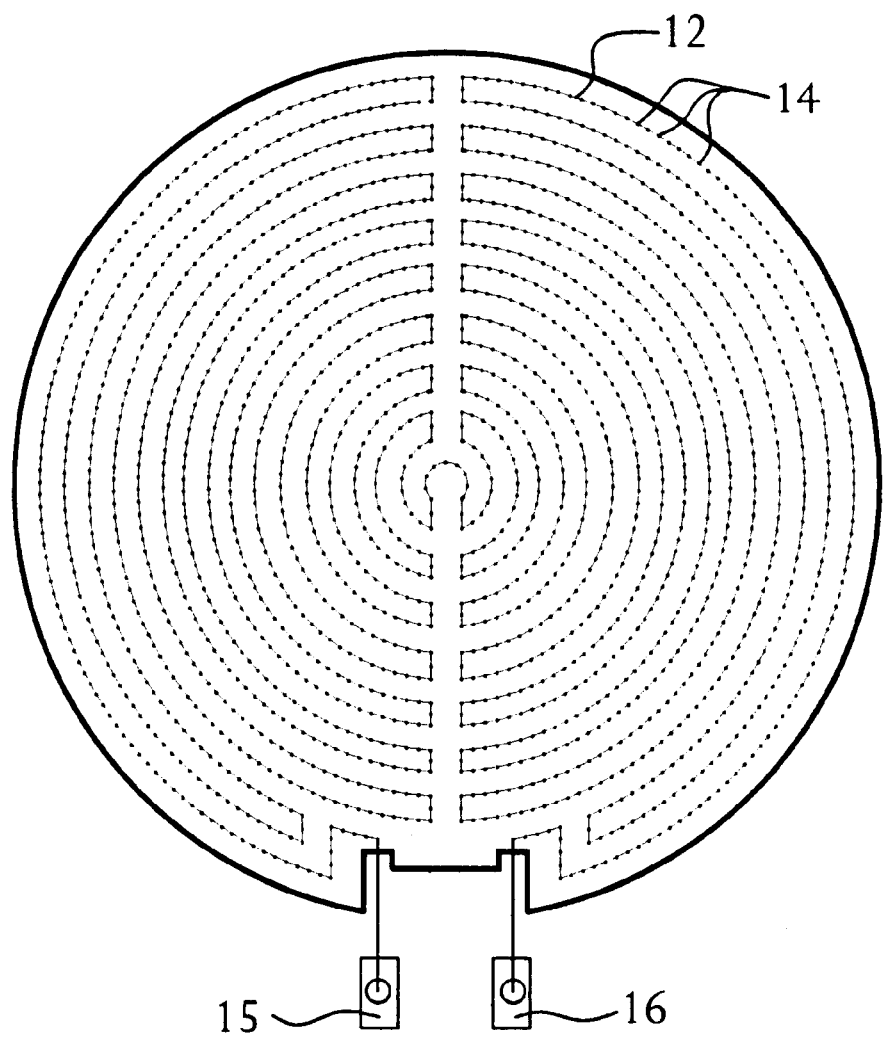
FIG. 2 is a rear plan view of the resistance heating element of FIG. 1.

With reference to the Figures, and particularly FIGS. 1, 1A and 2 thereof, there is shown a first embodiment of a resistance heating element 10 having a diameter of about 11 cm. The preferred resistance heating element 10 may include a regulating device for controlling electric current. Such a device can include, for example, a thermistor, or a thermocouple, for preventing overheating of the polymeric materials disclosed in this invention. The resistance heating elements 10 of this invention can take on any number of shapes and sizes, including squares, ovals, irregular circumference shapes, tubes, cup shapes and container shapes. Sizes can range from less than one inch square to 21 in.×26 in. with a single sewing operation, and greater sizes can be available if multiple elements are joined together.

Greater sizes are also available with continuous sewing where a substrate is fed from a roll of substrate.

As shown in FIG. 1, the resistance heating element 10 includes a resistance wire 12 disposed in a helical pattern or circuit path 18. The ends of the resistance wire 12 are generally riveted, grommeted, brazed, clinched, compression fitted or welded to a pair of electrical connectors 15 and 16. One circuit path is illustrated in FIGS. 1 and 2. The circuit includes a resistance heating material, which is ideally a resistance heating wire 12 wound into a serpentine path containing about 3–200 windings, or, a resistance heating material, such as ribbon, a foil or printed circuit, or powdered conducting or semi-conducting metals, polymers, graphite, or carbon, or a conductive coating or ink. More preferably the resistance heating wire 12 includes a Ni—Cr alloy, although certain copper, steel, and stainless-steel alloys could be suitable. A positive temperature coefficient wire may also be suitable. The resistance heating wire 12 can be provided in separate parallel paths, or in separate layers. Whatever material is selected, it should be electrically conductive, and heat resistant.

Substrates

As used herein, the term "supporting substrate" refers to the base material on which the resistance material, such as wires, are applied. The supporting substrate 11 of this invention should be capable of being pierced, penetrated, or surrounded, by a sewing needle for permitting the sewing operation. Other than this mechanical limitation, the substrates of this invention can take on many shapes and sizes. Flat flexible substrates are preferably used for attaching an electrical resistance wire with a thread. Non-plastic materials, such as glasses, semiconductive materials, and metals, can be employed so long as they have a piercable cross-sectional thickness, e.g., less than 10–20 mil, or a high degree of porosity or openings therethrough, such as a grid, scrim, woven or nonwoven fabric, for permitting the sewing needle of this invention to form an adequate stitch. The supporting substrate 11 of this invention need not necessarily contribute to the mechanical properties of the final heating element, but may contain high strength fibers. Such fibers could contain carbon, glass, aramid fibers melt-bonded or joined with an adhesive to form a woven or non-woven mat. Alternatively, the supporting substrate 11 of this invention may contain ordinary, natural, or synthetic fibers, such as cotton, wool, silk, rayon, nylon, polyester, polypropylene, polyethylene, etc. The supporting substrate may also comprise a synthetic fiber such as Kevlar or carbon fibers that have good thermal uniformity and strength. The advantage of using ordinary textile fibers, is that they are available in many thicknesses and textures and can provide an infinite variety of chemistry, porosity and melt-bonding ability. The fibers of this invention, whether they be plastic, natural, ceramic or metal, can be woven, or spun-bonded to produce non-woven textile fabrics.

Specific examples of supporting substrates 11 useful in this invention include non-woven fiberglass mats bonded with an adhesive or sizing material such as model 8440 glass mat available from Johns Manville, Inc. Additional substrates can include polymer impregnated fabric organic fabric weaves, such as those containing nylon, rayon, or hemp etc., porous mica-filled plate or sheet, and thermoplastic sheet film material. In one embodiment, the supporting substrate 11 contains a polymeric resin which is also used in either the first thermoplastic sheet 110 or second thermoplastic sheet 105, or both of a heated element assembly 100 described below.

Such a resin can be provided in woven or non-woven fibrous form, or in thin sheet material having a thickness of 20 mil. or less. Thermoplastic materials can be used for the supporting substrate 11 which will melt-bond or liquefy with the thermoplastic sheets 110, 105, so as to blend into a substantially uniform structure.

Sewing Operation

Figure 3:
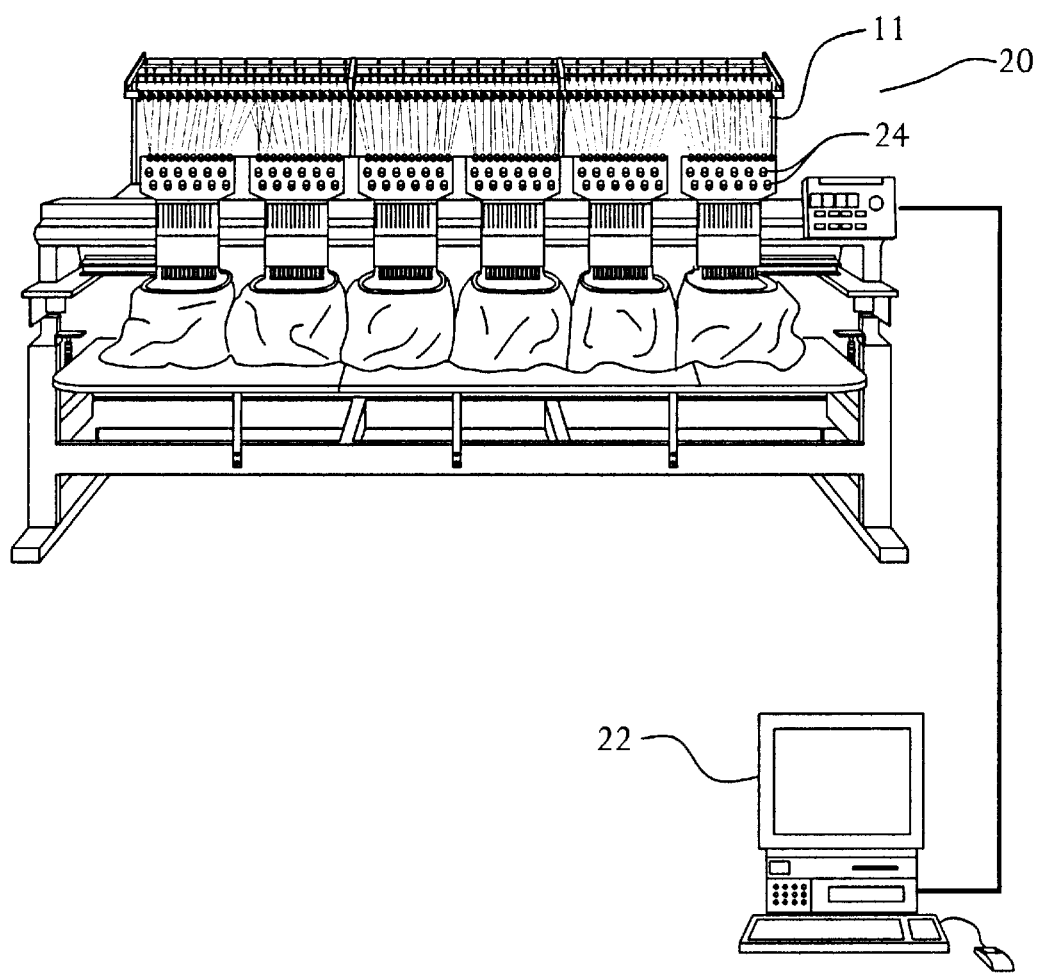
FIG. 3 is a front perspective view of a preferred programmable sewing machine and computer for manufacturing resistance heating elements.

With reference to FIG. 3, the preferred programmable sewing machine 20 will now be described. The preferred programmable sewing machine is one of a number of powerful embroidery design systems that use advanced technology to guide an element designer through design creation, set-up and manufacturing. The preferred programmable sewing machine 20 is linked with a computer 22, such as a personal computer or server, adapted to activate the sewing operations. The computer 22 preferably contains or has access to, embroidery or CAD software for creating thread paths, borders, stitch effects, etc.

The programmable sewing machine 20 includes a series of bobbins for loading thread and resistance heating wire or fine resistance heating ribbon. Desirably, the bobbins are prewound to control tension since tension, without excessive slack, in both the top and bottom bobbins is very important to the successful capturing of resistance heating wire on a substrate. The thread used should be of a size recommended for the preferred programmable sewing machine. It must have consistent thickness since thread breakage is a common mode of failure in using programmable sewing machines.

An industrial quality nylon, polyester or rayon thread is highly desirable. Also, a high heat resistant thread may be used, such as a Kevlar thread or Nomex thread known to be stable up to 500° F. and available from Saunders Thread Co. of Gastonia, North Carolina.

The programmable sewing machine of this invention preferably has up to 6–20 heads and can measure 6 foot in width by 19 feet long. The sewing range of each head is about 10.6 inches by 26 inches, and with every other head shut off, the sewing range is about 21 inches by 26 inches. A desirable programmable sewing machine is the Tajima Model No. TMLG116-627W (LT Version) from Tajima, Inc., Japan.

The preferred method of capturing a resistance heating wire 12 onto a supporting substrate 11 in this invention will now be described. First, an operator selects a proper resistive element material, for example, Ni—Cr wire, in its proper form. Next, a proper supporting substrate 11, such as 8440 glass mat, is provided in a form suitable for sewing. The design for the element is preprogrammed into the computer 22 prior to initiating operation of the programmable sewing machine 20. As with any ordinary sewing machine, the programmable sewing machine 20 of this invention contains at least two threads, one thread is directed through the top surface of the supporting substrate, and the other is directed from below. The two threads are intertwined or knotted, ideally somewhere in the thickness of the supporting substrate 11, so that one cannot view the knot when looking at the stitch and the resulting resistance heating element 10. As the top needle penetrates the substrate 11 and picks up a loop of thread mechanically with the aid of the mechanical device underneath, it then pulls it upward toward the center of the substrate 11 and if the substrate is consistent and the thread tension is consistent, the knots will be relatively hidden. In a preferred embodiment of this invention, the resistance heating wire 12 is provided from a bobbin in tension. The preferred programmable sewing machine 20 of this invention provides a third thread bobbin for the electrical resistance wire 12 so that the programmable sewing machine 20 can lay the resistance wire 12 down just in front of the top needle. The preferred operation of this invention provides a zig zag or cross stitch, as shown in FIG. 1A, whereby the top needle criss-crosses back and forth as the supporting substrate 11 is moved, similar to the way an ornamental rope is joined to a fabric in an embroidery operation. A simple looping stitch with a thread 14 is also shown. Sewing by guiding the top needle over either side of the resistance heating wire 12 captures it in a very effective manner and the process is all computer controlled so that the pattern can be electronically downloaded into the computer 22 and automatically sewn onto the substrate of choice.

The programmable sewing machine 20 can sew an electrical resistance wire 12, 5 mil-0.25 inch in diameter or thickness, onto a supporting substrate 11 at a rate of about 10–500 stitches per minute, saving valuable time and associated cost in making resistance heating elements.

The ability to mechanically attach resistive elements, such as wires, films and ribbons, to substrates opens up a multitude of design possibilities in both shape and material selection. Designers may mix and match substrate materials by selecting their porosity, thickness, density and contoured shape with selected resistance heating materials ranging in cross-section from very small diameters of about 5 mil to rectangular and irregular shapes, to thin films. Also, secondary devices such as circuits, including microprocessors, fiberoptic fibers or optoelectronic devices, (LEDs, lasers) microwave devices (power amplifiers, radar) and antenna, high temperature sensors, power supply devices (power transmission, motor controls) and memory chips, could be added for controlling temperature, visual inspection of environments, communications, and recording temperature cycles, for example. The overall thickness of the resistance heating element is merely limited by the vertical maximum position of the needle end, less the wire feed, which is presently about 0.5 inches, but may be designed in the future to be as great as 1 inch or more. Resistive element width is not nearly so limited, since the transverse motion of the needle can range up to a foot or more.

The use of known embroidery machinery in the fabrication of resistance heating elements allows for a wide variety of raw materials and substrates to be combined with various resistance heating materials. The above construction techniques and sewing operation also provide the ability to manufacture multi-layered substrates, including embedded metallic and thermally conductive layers with resistance wires wrapped in an electrically insulating coating, so as to avoid shorting of electric current. This permits the application of a resistance heating wire to both sides of the thermally conductive metallic layer, such as aluminum foil, for more homogeneously distributing resistance heat.

Figure 4:
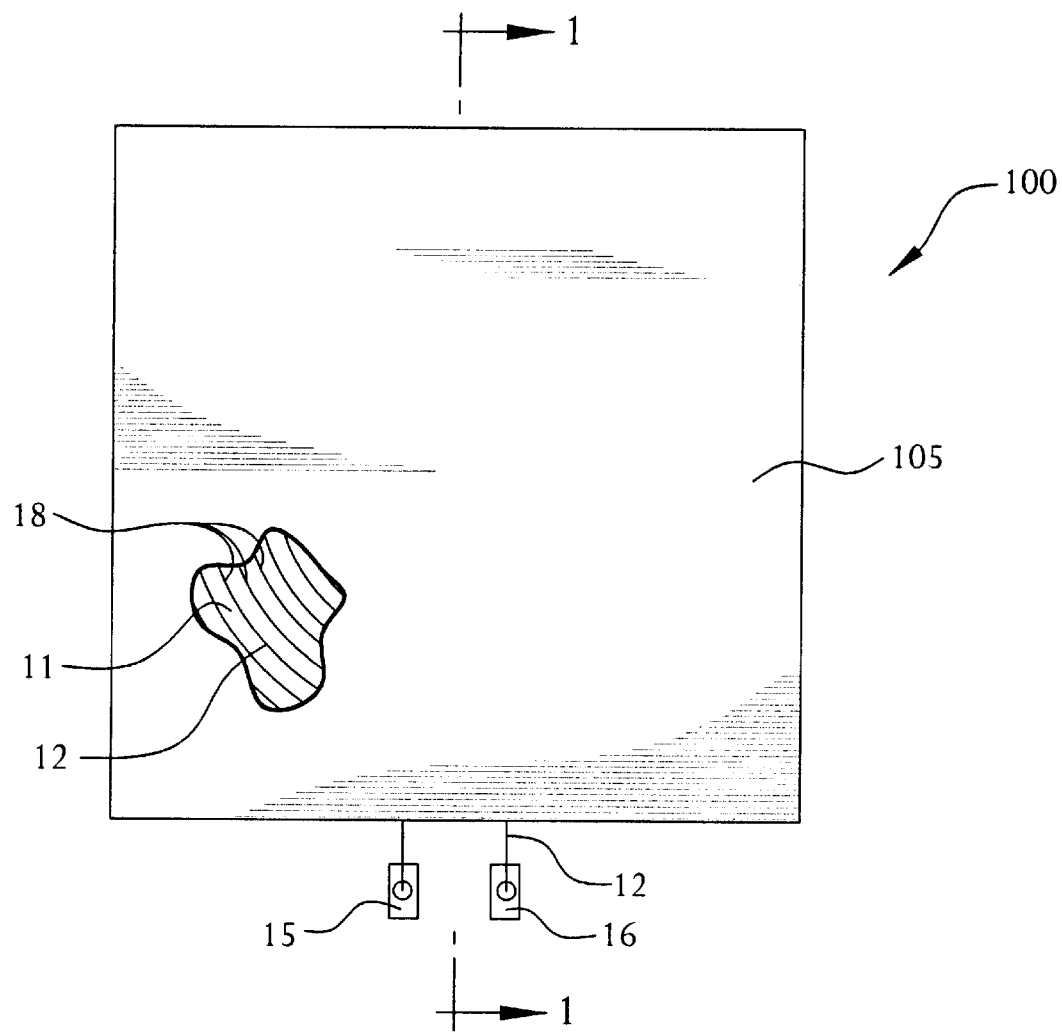
FIG. 4 is a top plan view of a heated element assembly including a resistance heating element according to the present invention.
Figure 5:
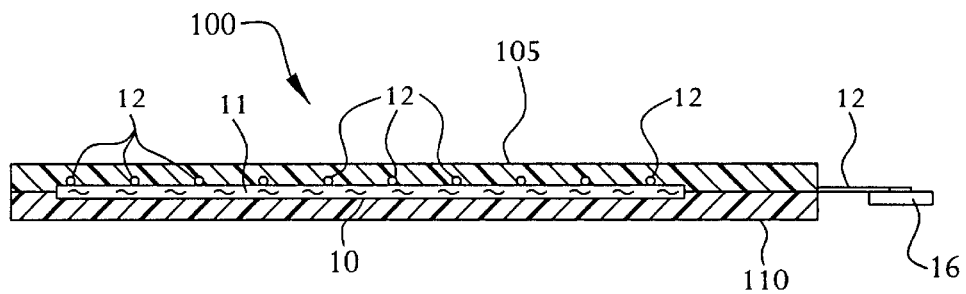
FIG. 5 is a cross-sectional view of the heated element assembly of FIG. 4 taken along lines 1—1.

Thermoplastic Laminate Heated Element Assembly and Heated Container Construction FIG. 4 is a top plan view of a heated element assembly 100 according to the present invention. The heated element assembly 100 includes a first thermoplastic sheet 110 and a second thermoplastic sheet 105 laminated to the first thermoplastic sheet 110. For illustrative purposes, second thermoplastic sheets 105 is shown partially removed from first thermoplastic sheet 110. A resistance heating element 10, described above, is laminated between and to the first and second thermoplastic sheets 110, 105 such that the thermoplastic sheets 110, 105 substantially encompass the circuit path 18, which includes resistance wire 12.

The supporting substrate of the resistance heating element 10 is preferably not thicker than 0.05 inch, and more preferably 0.025 inch. The supporting substrate should be flexible, either under ambient conditions or under heat or mechanical stress, or both. A thin semi-rigid heated element assembly 100 allows for closer proximity of the resistance heating wire 12 to an object to be heated when the heated element assembly is formed into a final element assembly, such as a combination containment bag and heater. Thin element assemblies according to the present invention provide the flexibility to choose materials with lower RTI (Relative Thermal Index) ratings because less heat needs to be generated by the resistance heating element 10 to provide heat to the outer surfaces of the heating element assembly 100.

Figure 7A:
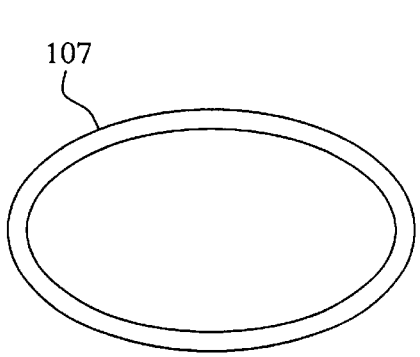
FIG. 7a is a top plan view of a tubular shaped thermoplastic body for providing thermoplastic sheets according to the present invention.
Figure 7B:
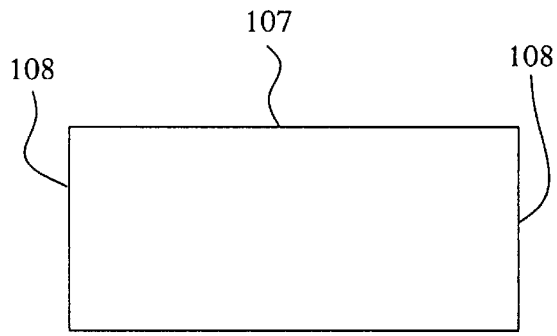
FIG. 7b is a side elevational view of a tubular shaped thermoplastic body for providing thermoplastic sheets according to the present invention.

The thermoplastic sheets 110, 105 are laminated to each other to secure resistance heating element 10 and to form a reformable continuous element structure. The thermoplastic sheets 110, 105 may be heated and compressed under sufficient pressure to effectively fuse the thermoplastic sheets together. A portion of this heat may come from energizing the resistance heating element 10. Alternatively, a resistance heating element 10 may be placed within a bag-shaped thermoplastic body (not shown) where the top layer of the bag may be considered a thermoplastic sheet and the bottom layer of the bag may be considered a thermoplastic sheet (e.g., two thermoplastic sheets secured along mating edges, but providing an opening for insertion of the resistance heating element 10). Air from within the bag may be evacuated, e.g., by pulling a vacuum, thereby collapsing the bag around the resistance heating element 10, and then heat and/or pressure may be applied to the collapsed structure to create a single heated element assembly 100. Also, heated element assembly 100 may be formed by extruding a tubular shaped thermoplastic body 107 (FIGS. 7a and 7b), disposing a resistance heating element 10 within the thermoplastic body 107, and heating and compressing the body 107, particularly along edges 108, to secure the heating element 10 within the thermoplastic body. Regardless of the initial form the thermoplastic sheets take, thermoplastic sheets are preferably laminated such that a flexible continuous element structure is created, including a resistance heating element 10 and preferably with little air trapped between the thermoplastic sheets.

Preferred thermoplastic materials include, for example: fluorocarbons, polypropylene, polycarbonate, polyetherimide, polyether sulphone, polyarylsulphones, polyimides, and polyetheretherkeytones, polyphenylene sulfides, polyether sulphones, and mixtures and co-polymers of these thermoplastics.

It is further understood that, although thermoplastic plastics are most desirable for fusible layers because they are generally heat-flowable, some thermoplastics, notably polytetraflouroethylene (PTFE) and ultra high-molecular-weight polyethylene (UHMWPE) do not flow under heat alone. Also, many thermoplastics are capable of flowing without heat, under mechanical pressure only.

Good results were found when forming a heated element assembly under the conditions indicated in TABLE 1 as follows:

TABLE

| MATERIAL | THICKNESS OF SHEET (mil) | PRESSURE (PSI) | TIME (minutes) | TEMP. (° F.) |
|---|---|---|---|---|
| Polypropolyne | 9 | 22 | 10 | 350 |
| Polycarbonate | 9 | 22 | 10 | 380 |
| Polysulfune | 19 | 22 | 15 | 420 |
| Polyetherimide | 9 | 44 | 10 | 430 |
| Polyethersulfone | 9 | 44 | 10 | 460 | where no vacuum was pulled, "thickness" is the thickness of the thermoplastic sheets in mils (1 mil=0.025 mm=0.001 inch), "pressure" represents the amount of pressure applied to the assembly during lamination, "temperature" is the temperature applied during lamination, and "time" is the length of time that the pressure and heat were applied.

The first and second thermoplastic sheets 110, 105 and resistance heating element 10 of the heated element assembly 100 may also be laminated to each other using an adhesive. In one embodiment of the present invention, an ultraviolet curable adhesive may be disposed between the resistance heating element 10 and the first thermoplastic sheet 110 and between the resistance heating element 10 and the second thermoplastic sheet 105, as well as between areas of the thermoplastic sheets 110, 105 which are aligned to be in direct contact. An ultraviolet curable adhesive may be used that is activated by ultraviolet light and then begins to gradually cure. In this embodiment of the present invention, the adhesive may be activated by exposing it to ultraviolet light before providing the second of the thermoplastic sheets 110, 105. The thermoplastic sheets 110, 105 may then be compressed to substantially remove any air from between the sheets 110, 105 and to secure resistance heating element 10 between the thermoplastic sheets 110, 105.

Figure 6:
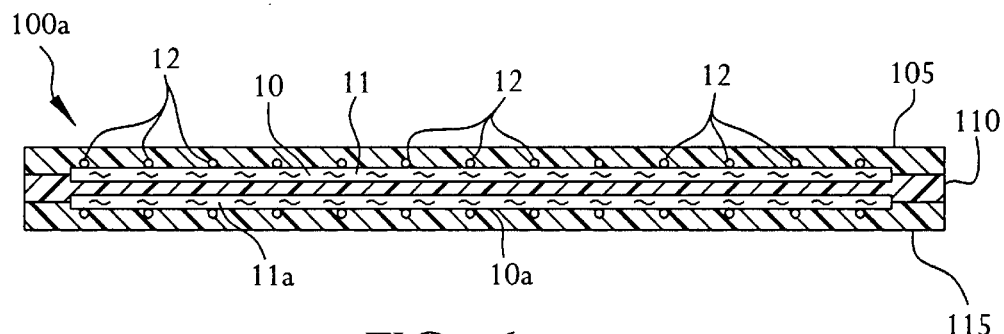
FIG. 6 is a cross-sectional view of a multilayered heated element assembly according to the present invention.

FIG. 6 illustrates that a heated element assembly 100a according to the present invention may include a plurality of heated layers. A second resistance heating element 10a may be laminated between and to thermoplastic sheet 110 and a third thermoplastic sheet 115.

The thicknesses of thermoplastic sheets 110, 105 and the thickness of supporting substrate 11 and resistance heating material 12 are preferably selected to form a reformable continuous element structure that maintains its integrity when the element is formed into a final element structure. The heated element assembly 100 according to the present invention, then, is a semi-rigid structure in that it may be reformed, such as by simply folding or folding under heat, pressure, or a combination thereof as required by the chosen thermoplastics, into a desired shape without sacrificing the integrity of the structure.

Figure 8:
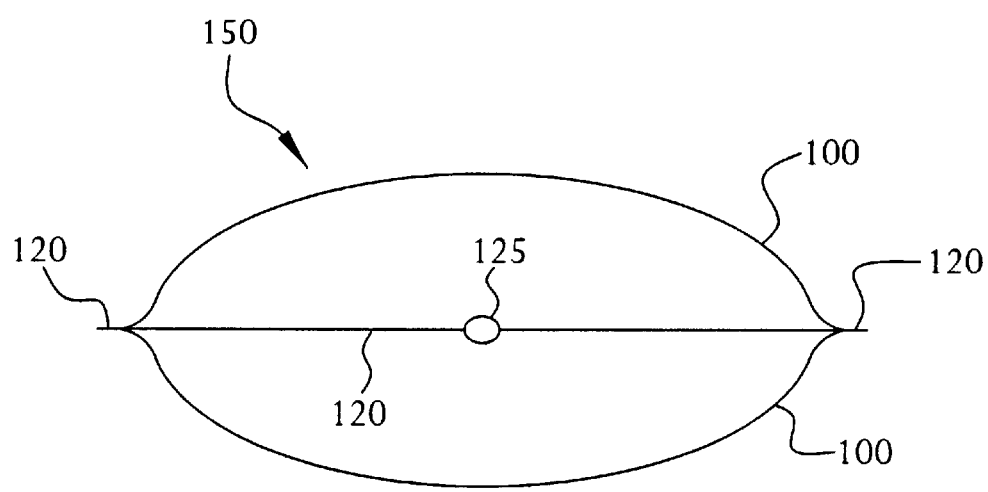
FIG. 8 is a front plan view of an exemplary heated containment bag according to the present invention.
Figure 9:
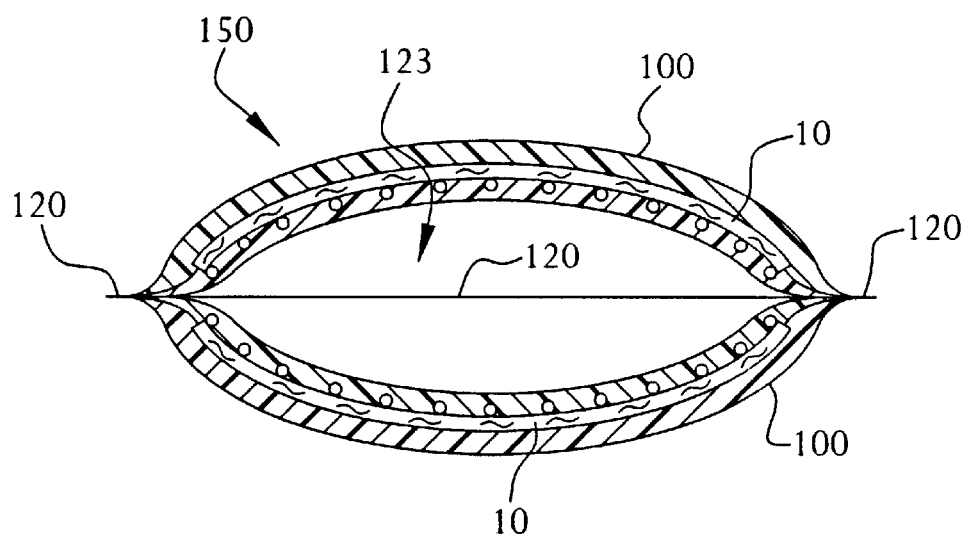
FIG. 9 is a cross-sectional view of the containment bag of FIG. 8.
Figure 10:
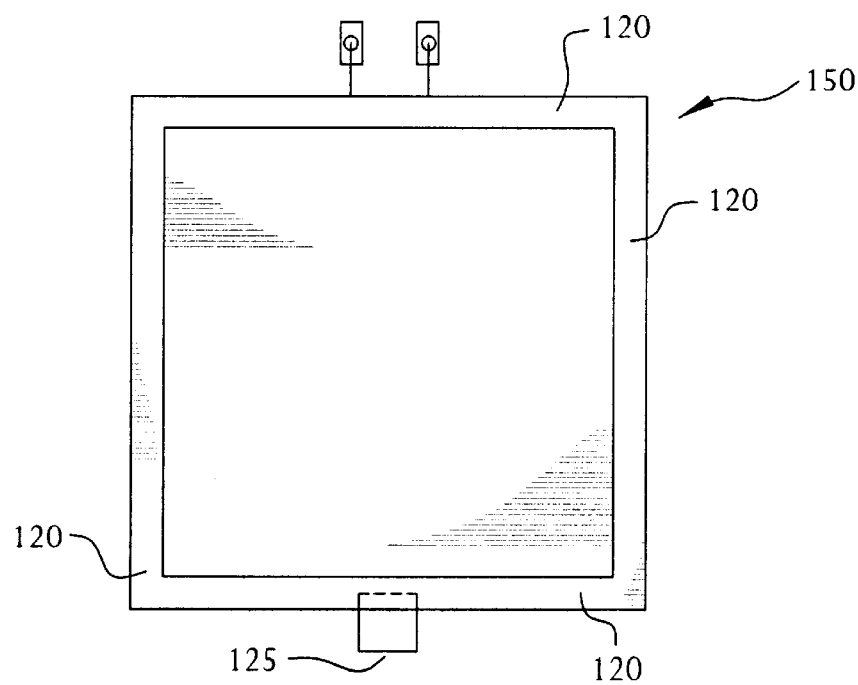
FIG. 10 is a top plan view of an exemplary heated containment bag according to the present invention.
Figure 11:
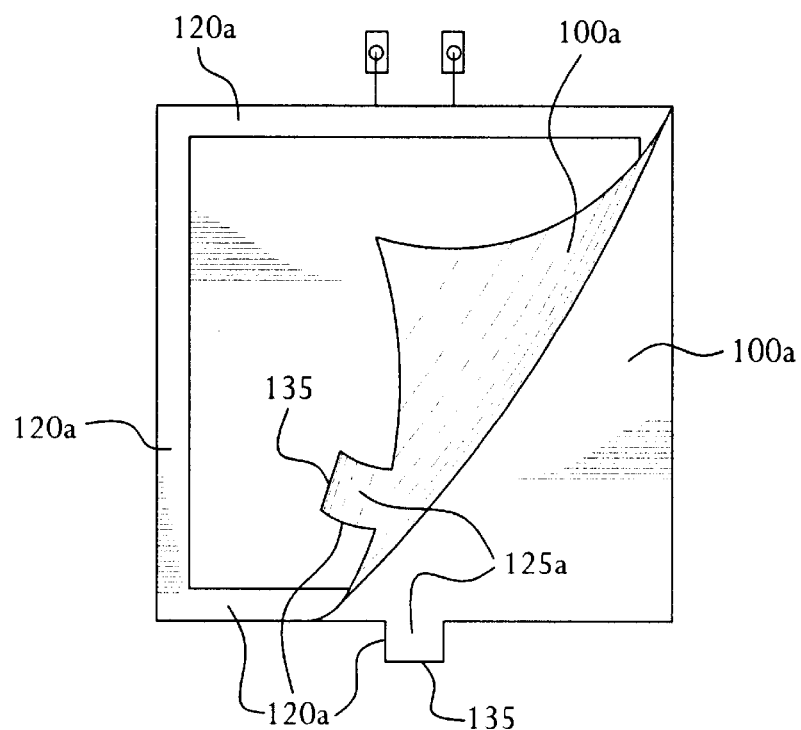
FIG. 11 is a top plan view of two affixed but partially separated heated element assemblies according to the present invention shaped to provide a heated containment bag with a nozzle.

FIG. 8 is a side elevational view of an exemplary combination heated containment bag and heater 150 with flexible walls according to the present invention. The containment bag 150 includes at least a first and second heated element assemblies 100. FIG. 9 is a cross-sectional view of the containment bag 150, and FIG. 10 is a top plan view of the containment bag 150. Two or more heated element assemblies 100 may be aligned along mating edges 120, and the edges 120 may be fused or otherwise sealed to form a heated containment bag 150 having an enclosed area, designated generally as area 123, for holding contents. Alternatively, a single heated element assembly 100 may be folded into a bag or container shape and its mating edges may be fused to form a heated containment bag. The assembly 100 may also be heated to facilitate folding into the containment bag shape and enable the assembly to maintain the containment bag shape after cooling. The containment bag 150 preferably has flexible sidewalls formed from heated element assemblies 100 which are capable of substantially conforming to the contents contained in area 123, thereby efficiently heating the contents of the containment bag 150.

The heated containment bag 150 preferably includes a dispensing means 125, i.e., a nozzle or spout, that allows the contents of the heated containment bag 150 to be inputted and expelled. The nozzle 125 may be included as a separate structure captured and sealed along an edge 120 or other area on a containment bag 150.

Alternatively, each heated element assembly 100a may be shaped to include a portion of the nozzle, as shown in FIG. 1. A nozzle 125a may then be formed when the heated element assemblies 100a are mated and fused along edges 120a. The dispensing region 135 can either be fused along with edges 120a and later punctured or otherwise be left open or be plugged. This alternative of forming a nozzle from appropriately shaped heated element assemblies 100a provides the added benefit of allowing the circuit path 18 of the resistance heating element 10 of at least one of the heated element assemblies 100a to continue into the nozzle shaped area in order to provide heat to the nozzle area, thereby preventing blockages from forming and providing a uniformly heated container. This embodiment may be used, for example, for a containment bag as used in a hot cheese dispenser where the dispenser is not used for lengthy, and irregular, periods of time.

Heated containers 150 according to the present invention provide several advantages over non-rigid and rigid containers which do and not include a heat source according to the present invention. The heat source, i.e., the resistance heating element 10, intimately surrounds the contents of the container 150, which may be, for example, blood plasma, food product, or other contents, whether they be gaseous, liquid, solid, or semi-solid. The product's packaging is capable of effectively doubling as its heat source, thereby removing layers of material or air space between the contents and its heat source as well as eliminating the need for an external heat source. Also, secondary devices as described above, such as temperature gauges, may be disposed more intimately with the contents or conditions that are being monitored.

A heated element assembly 100 may also be positioned in a mold and over molded to form a selected molded heated structure. A heated element assembly 100 may optionally be thermoformed to conform to at least a part of the mold structure and to preferentially align the resistance heating element within the mold. Once the heated element assembly is positioned within a mold, the resistance heating element 10 of the heated element assembly 100 may be energized to soften the thermoplastic sheets, and the heated element assembly may be over molded with a thermoplastic.

The energizing and overmolding may be timed such that the thermoplastic sheets and over molded thermoplastic form a substantially homogenous structure when solidified. Alternatively, the thermoplastic sheets may be allowed to soften as a result of mold flow alone. The thermoplastic materials of the sheets and over molded thermoplastic are preferably matched to further facilitate the creation of a homogenous structure. The supporting substrate 11 may also be selected to be a thermoplastic to better promote the formation of a homogenous structure. The energizing may be timed to soften the thermoplastic sheets before, after, or during the overmolding process, depending upon the standard molding parameters, such as the flow characteristic of the selected thermoplastics, the injection molding fill time, the fill velocity, and mold cycle. The assembly is also amenable to other molding processes, such as injection molding, compression molding, thermoforming, and injection-compression molding.

Figure 14:
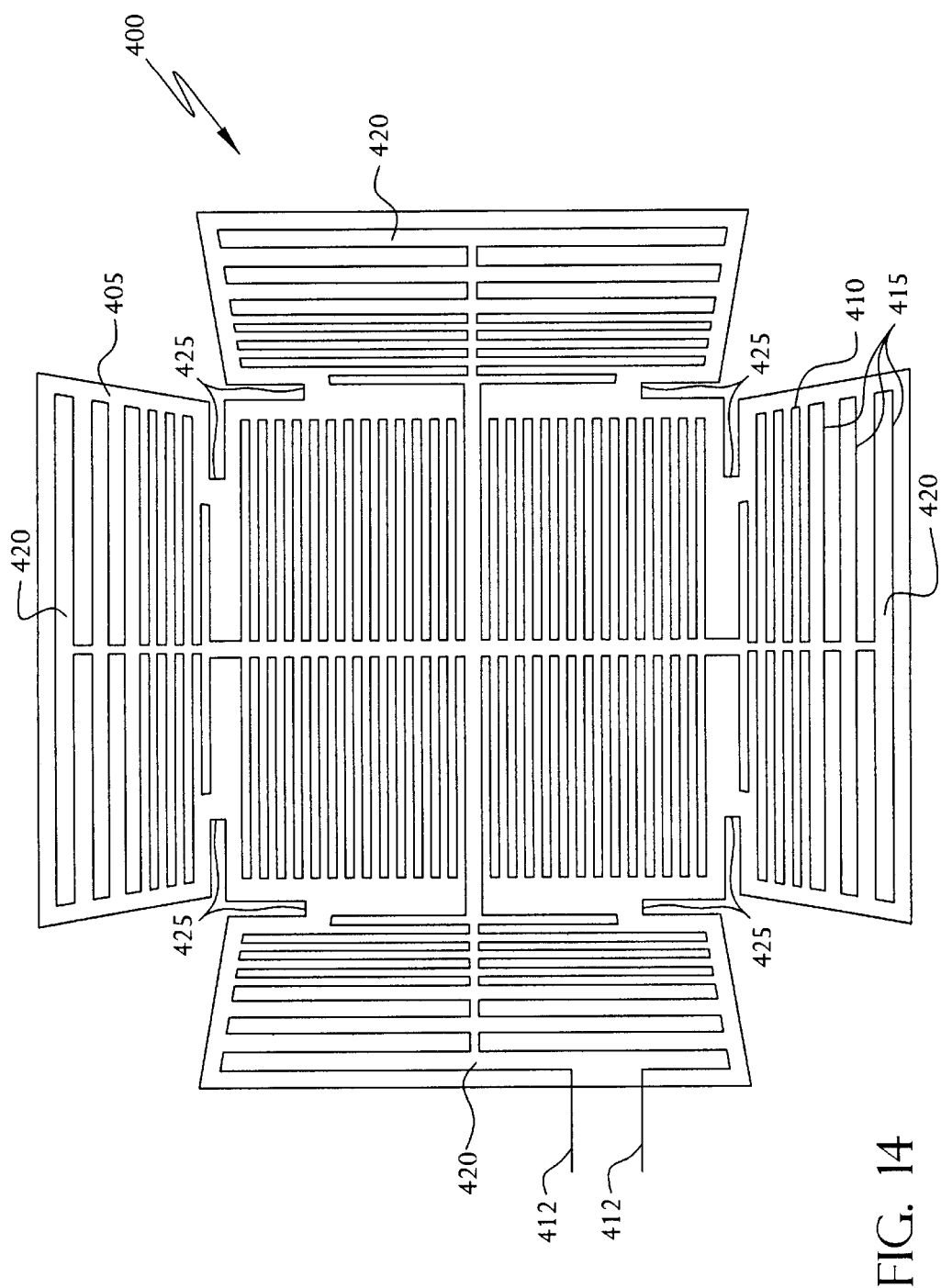
FIG. 14 is a top plan view of a resistance heating element which may be folded to form a three dimensional heater assembly.
Figure 15:
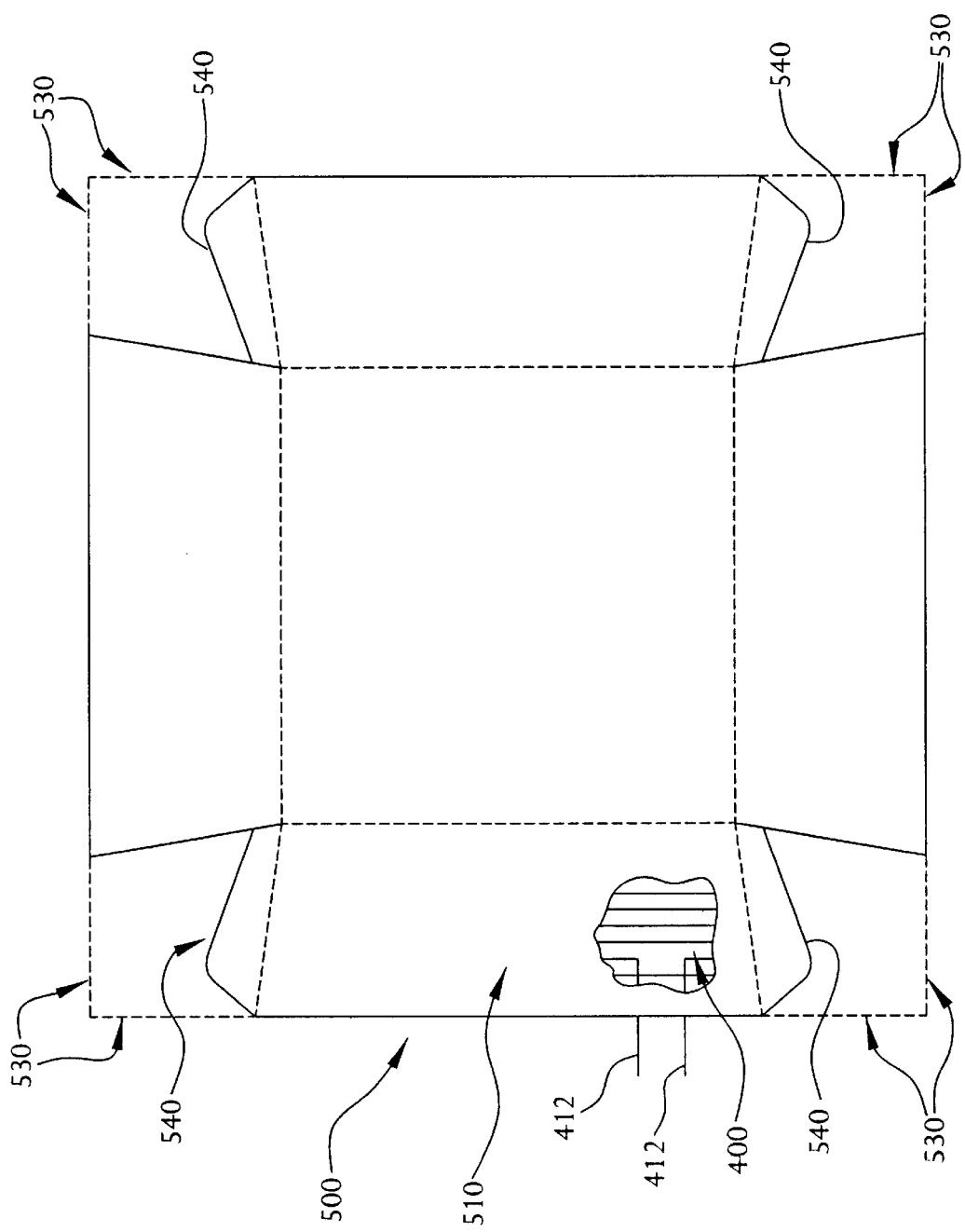
FIG. 15 is a top plan view of a heating element including the resistance heating element of FIG. 14 where the laminated structure has been cut to form a profile for a heated container.
Figure 16:
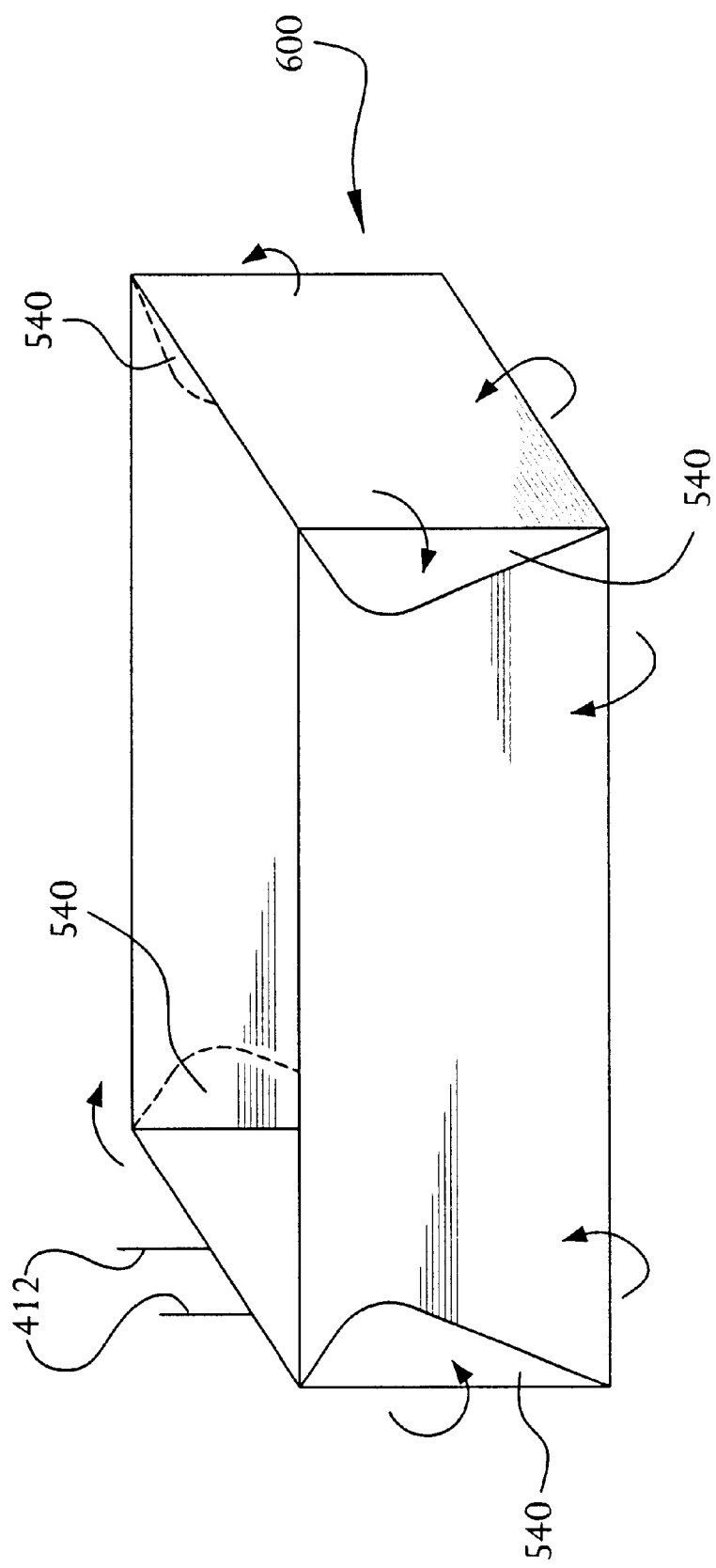
FIG. 16 is a perspective view of a heated container formed from the cut heating element of FIG. 15.

FIGS. 14, 15, and 16 illustrate an exemplary heated element assembly which may be formed into a heated container final element assembly. FIG. 14 is a top plan view of an exemplary resistance heating element 400. The resistance heating element 400 includes a supporting substrate 405 shaped in the profile of a flattened container. The profile may either be initially shaped in this profile shape or cut to the profile shape from a larger supporting substrate. Resistance heating material is affixed to the supporting substrate 405 and is preferably resistance wire 410 sown to supporting substrate 405.

The resistance heating element 400 shown in FIG. 14 includes a plurality of flap portions 420 capable of rotation about a first axis of rotation indicated generally at joints 425. The circuit path 415 formed by resistance wire 410 continues onto flap portions 420 and terminates at terminal end portions 412.

FIG. 15 is a top plan view of a heating element assembly 500. The resistance heating element 400 is laminated between two thermoplastic sheets, only the top sheet 510 of which is shown, to form a reformable continuous element structure. A portion of the thermoplastic sheet 510 is shown removed in order to show the resistance heating element 400.

The dashed lines 530 indicate portions of the laminated structure that may be removed, such as by stamping or die cutting, from the laminated structure to leave a foldable profile which may be formed into the a non-planar container 600 shown in FIG. 16. The remaining dashed lines of FIG. 15 indicate fold lines. The heating element assembly 500 preferably includes joining tabs 540 which may be used to help form the heated container 600 final element assembly shown in FIG. 16 and described below.

Heated container 600 may be formed by folding the heating element 500 along the dashed lines of FIG. 15 and in the direction of the arrows shown in FIG. 16. The flaps 420 of the resistance heating element 400 are laminated between thermoplastic layers and are folded into the container shape shown in FIG. 16. The folding step may include rethermalizing the thermoplastic structure while folding in order to thermoform the structure into the desired heat planes. The thermoplastic joining tabs 540 may then be folded to mate with an adjacent surface of the continuous element structure. The joining tabs 540 are preferably heated to fuse them to the adjacent surfaces. The container 600 may even be made fluid tight if each mating edge is fused or if the joining tabs 540 cover all seams between adjacent surfaces.

It should be apparent that the container 600 provides heat on five different interior planes may, but is formed from an easily manufactured planar heating element 500. It should further be apparent that the present invention is not limited in any way to the container structure 600 or heating element 500 described above. Rather, the above describe method of manufacturing and heating element structure may be used to forms cups, enclosed containers, boxes, or any other structure which may be formed from a planar profile.

Figure 12:
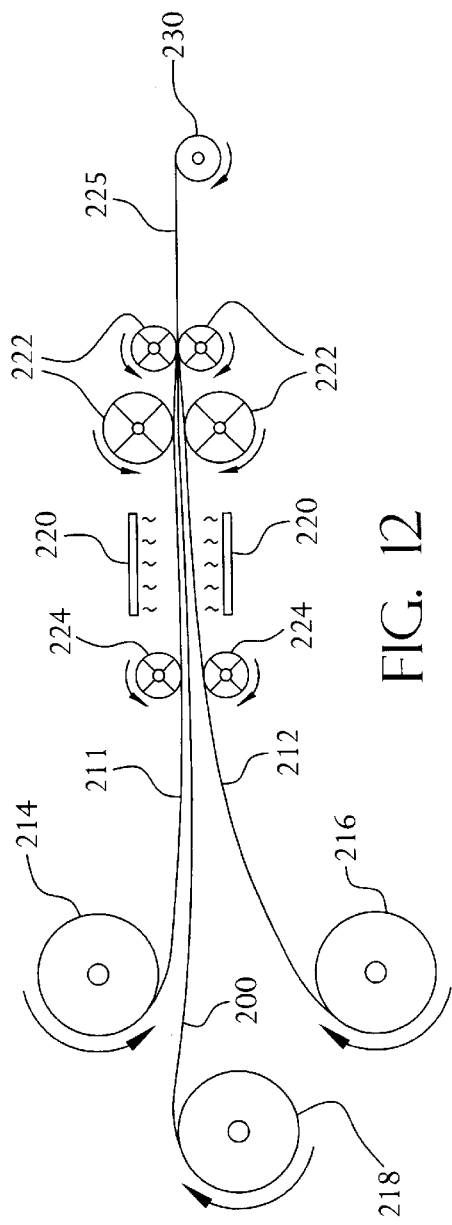
FIG. 12 is a diagram of an exemplary method of manufacturing a sheet of heated element assemblies according to the present invention.
Figure 13:
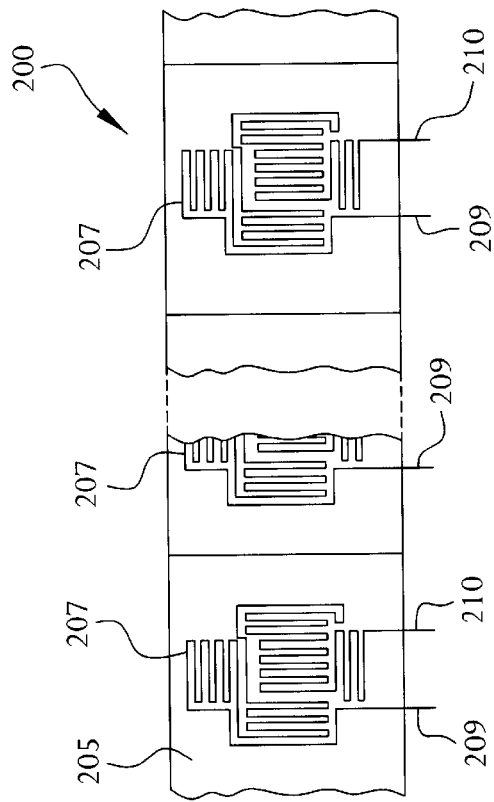
FIG. 13 is a diagram of a sheet of resistance heating elements shown in partial according to the present invention.

A sheet of heating elements and a method of manufacturing the same is described hereafter. In another exemplary embodiment of the present invention, a sheet of heated element assemblies 225 is provided, as shown in FIG. 12. The sheet of heated element assemblies 225 includes a first and second affixed thermoplastic sheets, as described above, and a sheet of resistance heating elements 200 (FIG. 13) secured between and to the first and second thermoplastic sheets. Essentially, the sheet of resistance heating elements 200 comprises a plurality of connected resistance heating elements 10. The sheet of resistance heating elements 200 comprises a supporting substrate 205 and a plurality of spaced circuit paths 207, each of the spaced circuit paths comprising an electrical resistance heating material fastened to the supporting substrate 205 to form a predetermined circuit path having a pair of terminal end portions 209, 210. The shape of the circuit path 207 is merely illustrative of a circuit path shape, and any circuit path shape may be chosen to support the particular end use for a heated element assembly included in the sheet of heated element assemblies 225. The dashed lines of FIG. 13 indicate where an individual resistance heating element may be removed from the sheets of resistance heating elements 225.

A sheet 225 of heated element assemblies may be manufactured using conventional mass production and continuous flow techniques, such as are described in U.S. Pat. No. 5,184,969 to Sharpless et al., the entirety of which is incorporated herein by reference. For example, as illustrated in FIG. 12, first and second thermoplastic sheets 210, 212 may be provided from a source, such as rolls 214, 216 of thermoplastic sheets, or extruded using known extrusion techniques as a part of the manufacturing process. One manufacturer of such thermoplastic sheet extruders is Killion Extruders Inc. of Cedar Grove, New Jersey. Likewise, a sheet of resistance heating elements 200 may be provided from a source, such as roll 218. Sheet 200 may be manufactured as described above in the "Sewing Operation" section. The sheets 200, 212, 214 may be made to converge, such as by rollers 224, between a heat source, such as radiant heating panels 220, to soften the thermoplastic sheets 210, 212. A series of rollers 222 compresses the three sheets 200, 212, 214 into a sheet of heated element assemblies 225, thereby also removing air from between the sheets 200, 212, 214. The rollers 222 may also provide heat to help fuse the sheets 200, 212, 214 and/or may be used to cool freshly laminated sheets 200, 212, 214 to help solidify the heated sheets into the sheet of heated element assemblies 225 after compression.

It should be apparent that a sheet of a plurality of multiple-layered heating element assemblies, such as a sheet including a plurality of heating element assemblies 100a of FIG. 6, may also be manufactured simply by including a third thermoplastic sheet and a second sheet of resistance heating elements to the process described above.

A sheet of heated element assemblies may also be manufactured using blown film processes and techniques. Blown film extruders are available from the Windmoeller & Hoelscher Corporation of Lincoln, R.I. A sheet of resistance heating elements 200 may be introduced within a blown cylindrical extrusion mass before the mass is collected into a thin film. In this manner, a sheet of resistance heating elements is effectively laminated between a first and second thermoplastic sheets, i.e., between the two halves of the cylindrical extrusion mass.

Regardless of the specific manufacturing technique, the sheet of heated element assemblies 225 may be collected into a roll 230. The roll 230 may then be used by an original equipment manufacture (OEM) for any desired manufacturing purpose. For example, the OEM may separate or cut individual heated element assemblies from the roll and include the heated element assembly in a desired product, e.g, a container or molded product. An individually manufactured heated element assembly as mentioned above or a heated element assembly removed from a sheet of heated element assemblies 225 is amenable to secondary manufacturing techniques, such as die cutting, stamping, or thermoforming to a desired shape or combination thereof as described above. Each heated element assembly may be cut or stamped into a preselected shape for use in a particular end product even while still a part of sheet 225 and then collected into a roll 230. The circuit path of the resistance heating element of the heated element assembly may be appropriately shaped to conform to the desired shape of a selected product and heat planes in which the heated element assembly is to be included or formed.

The formable semi-rigid feature of the heated element assemblies of the present invention provides a designer the opportunity to include the assembly in complex heat planes. The assembly may be cut to a desired formable shape, and the circuit path is preferably designed to substantially conform to this shape or the desired heat planes. The assembly may then be rethermalized and folded to conform to the heat planes designed for the assembly to occupy.

A preferred thermoplastic sheet may range from approximately 0.004 inch to 0.100 inch. Thus, the thickness of the thermoplastic sheets of a heated element assembly may be chosen to effectively bias heat generated by a resistance heating element in a selected direction. For example, referring to the heated containment bag 150 discussed above, the outer thermoplastic sheets of the heated element assemblies 100 may be chosen to be thicker than the interior thermoplastic sheets (those sheets contacting any contents of the containment bag 150) of the heated element assemblies 100. In doing so, heat generated by the heating element assemblies 100 may be effectively biased toward the contents of the containment bag 150 and away from the container's surroundings. The supporting substrate itself may provide an insulation barrier when the circuit path is oriented towards, for example, contents to be heated and the supporting substrate is oriented toward an outer or gripping surface.

Similarly, one or both of the thermoplastic sheets of a heated element assembly 100 or heated element assembly 500 may be coated with a thermally conductive coating that promotes a uniform heat plane on the heated element assembly. An example of such a coating may be found on anti-static bags or Electrostatic Interference (ESI) resistive bags used to package and protect semiconductor chips. Also, thermally conductive, but preferably not electrically conductive, additive may be added to the thermoplastic sheets to promote heat distribution. Examples of such additive may be ceramic powders, such as, for example, $Al_2O_3$, MgO, $ZrO_2$, boron nitride, silicon nitride, $Y_2O_3$, SiC, $SiO_2$, $TiO_2$, etc.

A thermally conductive layer and/or additive is useful because a resistance wire typically does not cover all of the surface area of a resistance heating element 10.

As described above, the heated element assembly of the present invention lends itself to many automated and secondary manufacturing techniques, such as stamping, die cutting, and overmolding, to name a few. Designers can easily choose thermoplastics and other materials for their designs that meet required RTI (relative thermal index) requirements for specific applications by following standard design techniques and parameters set by materials manufacturers Also, heated containers such as described above allow the food industry to efficiently and effectively reheat prepared foods, as is often required of businesses that operate large or small food service venues or that purchase from distributors of prepared foods. Also, among the many advantages of the present invention is the ability to intimately locate a secondary device captured between the thermoplastic sheets, such as a memory device or other data collector within close proximity to a food product, thereby allowing more accurate data collection. This data, as an example, may be used to prove that a food was prepared at a temperature and for a time period sufficient to kill the E. coli bacteria.

Although various embodiments have been illustrated, this is for the purpose of describing, but not limiting the invention. For example, a heated container could be formed from more than two heated element assemblies. The heated containers of the present invention, also, are by no means limited to food products, but may have utility in many industries, such as the medical industry. Further, the assembly line described above is merely illustrative of one means of forming a sheet of heated element assemblies. More, the supporting substrate shapes and circuit paths described above and shown in the drawings are merely illustrative of possible circuit paths, and one of ordinary skill should appreciate that these shapes and circuit patterns may be designed in other manners to accommodate the great flexibility in uses and number of uses for the heated element assembly of the present invention. Therefore, various modifications which will become apparent to one skilled in the art, are within the scope of this invention described in the attached claims.

What is claimed is:

1. A method of manufacturing a heated element assembly, comprising the steps of:
   (a) providing a first thermoplastic sheet;
   (b) providing a second thermoplastic sheet;
   (c) disposing a resistance heating element between said first and second thermoplastic sheets, said resistance heating element comprising:
      (i) a supporting substrate having a first surface thereon;
      (ii) an electrical resistance heating material fastened to said supporting substrate, said electrical resistance heating material forming a predetermined circuit path having a pair of terminal end portions; and
      (iii) a first flap portion capable of rotation about a first axis of rotation, said circuit path continuing onto at least a portion of said flap portion;
   (d) laminating said first and second thermoplastic sheets such that said resistance heating element is secured between and to said first and second thermoplastic sheets to form a reformable continuous element structure; and (e) forming said continuous element structure into a final element assembly configuration whereby at least said first flap portion is rotated about said first axis to provide resistance heating in at least two planes.

2. The method of claim 1, wherein said step of laminating includes the steps of heating said thermoplastic sheets and compressing said thermoplastic sheets to laminate said resistance heating element between and to said thermoplastic sheets.

3. The method of claim 1, wherein said step of forming includes the step of thermoforming said flexible continuous structure into a final element configuration.

4. The method of claim 1, further comprising the steps of cutting said continuous element structure into a foldable profile before forming said continuous element structure into said final element assembly configuration.

5. The method of claim 4, wherein said profile includes at least one joining tab, said method further comprising the step of mating said joining tab to an adjacent surface of said continuous element structure after forming said continuous element structure into a final element assembly configuration.

6. The method of claim 1, wherein said step of providing said first thermoplastic sheet and said second thermoplastic sheet includes the step of providing a tubular-shaped thermoplastic body including said thermoplastic sheets and said step of disposing said resistance heating element includes the step of disposing said resistance heating element within said tubular-shaped thermoplastic body.

7. The method of claim 1, further comprising the steps of:
(f) energizing said resistance heating element to soften said thermoplastic sheets; and
(g) overmolding said heated element assembly with a thermoplastic, said steps of energizing and overmolding timed such that said thermoplastic sheets and over molded thermoplastic form a substantially homogenous structure.

8. A method of manufacturing a sheet of heated element assemblies, comprising the steps of:
(a) providing a first thermoplastic sheet;
(b) providing a second thermoplastic sheet;
(c) disposing a sheet of resistance heating elements between said first thermoplastic sheet and said second thermoplastic sheet, said sheet of resistance heating elements comprising:
(i) a supporting substrate having a first surface thereon; and
(ii) a plurality of spaced circuit paths, each of said spaced circuit paths comprising an electrical resistance heating material fastened to said supporting substrate to form a predetermined circuit path, said circuit path having a pair of terminal end portions, each of said circuit paths continuing onto a first flap portion of a resistance heating element capable of rotation about a first axis of rotation; and
(d) laminating said first and second thermoplastic sheets such that said sheet of resistance heating elements is secured between and to said first and second thermoplastic sheets to form a continuous element structure.

9. The method of claim 8, wherein said step of laminating includes the steps of heating said thermoplastic sheets and compressing said thermoplastic sheets to laminate said sheet of resistance heating elements between and to said thermoplastic sheets.

10. The method of claim 8, further comprising the steps of removing at least one heating element assembly from said sheet of heating element assemblies, said heated element assembly being a continuous element structure, and forming said continuous element structure into a final element assembly configuration whereby at least said first flap portion of said resistance heating element is rotated about said first axis to provide resistance heating in at least two planes.

11. The method of claim 8, wherein said steps of providing a first thermoplastic sheet and a second thermoplastic sheet and disposing said sheet of resistance heating elements include the steps of extruding a tubular-shaped thermoplastic body including said first and second thermoplastic sheets and disposing said sheet of resistance heating elements within said tubular-shaped thermoplastic body.

12. A method of manufacturing a final element assembly configuration, comprising the steps of:
(a) providing a first thermoplastic sheet;
(b) providing a second thermoplastic sheet;
(c) disposing a sheet of resistance heating elements between said first thermoplastic sheet and said second thermoplastic sheet, said sheet of resistance heating elements comprising:
(i) a supporting substrate having a first surface thereon; and
(ii) a plurality of spaced circuit paths, each of said spaced circuit paths comprising an electrical resistance heating material fastened to said supporting substrate to form a predetermined circuit path, said circuit path having a pair of terminal end portions, each of said circuit paths continuing onto a first flap portion of a resistance heating element capable of rotation about a first axis of rotation;
(d) laminating said first and second thermoplastic sheets such that said sheet of resistance heating elements is secured between and to said first and second thermoplastic sheets to form a continuous element structure including a sheet of heated element assemblies;
(e) removing at least one heating element assembly from said sheet of heating element assemblies;
(f) cutting said at least one heated element assembly into a foldable profile; and
(g) forming said foldable profile into a final element assembly configuration whereby at least said first flap portion of a resistance heating element of said at least one heated element assembly is rotated about said first axis to provide resistance heating in at least two planes.

13. The method of claim 12, wherein said step of cutting includes the step of stamping or die cutting said at least one heated element assembly into said profile.

14. The method of claim 12, wherein said profile includes at least one joining tab, said method further comprising the step of mating each of said joining tabs to an adjacent surface of said heated element assembly after forming said heated element assembly into said final element assembly configuration.

15. A method of manufacturing a heated element assembly, comprising the steps of:
(a) providing a thermoplastic bag, said thermoplastic bag including a first and second thermoplastic walls;
(b) disposing a resistance heating element within said thermoplastic bag and between said thermoplastic walls, said resistance heating element comprising:
(i) a supporting substrate having a first surface thereon;
(ii) an electrical resistance heating material fastened to said supporting substrate, said electrical resistance heating material forming a predetermined circuit path having a pair of terminal end portions; and (iii) a first flap portion capable of rotation about a first axis of rotation, said circuit path continuing onto at least a portion of said flap portion;

(c) evacuating air from said bag to compress said bag around said resistance heating element and applying heat and pressure to said baa use said thermoplastic walls and secure said resistance heating element within said bag to form a reformable continuous element structure; and (d) forming said continuous element structure into a final element assembly configuration whereby at least said first flap portion is rotated about said first axis to provide resistance heating in at least two planes.

* * * * *

UNITED STATES PATENT AND TRADEMARK OFFICE
CERTIFICATE OF CORRECTION

| | | |
|---|---|---|
| PATENT NO. | : 6,519,835 B1 | Page 1 of 1 |
| DATED | : February 18, 2003 | |
| INVENTOR(S) | : Theodore Von Arx, Keith Laken and John W. Schlesselman | |

It is certified that error appears in the above-identified patent and that said Letters Patent is hereby corrected as shown below:

<u>Column 17,</u>
Line 8, delete "baa use" and insert therefor -- bag to fuse --.

Signed and Sealed this

Twenty-first Day of October, 2003

JAMES E. ROGAN
*Director of the United States Patent and Trademark Office*